United States Patent
Namizuka et al.

(10) Patent No.: US 7,545,538 B2
(45) Date of Patent: Jun. 9, 2009

(54) IMAGE-PROCESSING APPARATUS, IMAGE-PROCESSING METHOD AND RECORDING MEDIUM

(75) Inventors: Yoshiyuki Namizuka, Kanagawa (JP); Rie Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 11/313,953

(22) Filed: Dec. 22, 2005

(65) Prior Publication Data

US 2006/0098227 A1    May 11, 2006

Related U.S. Application Data

(63) Continuation of application No. 09/960,944, filed on Sep. 25, 2001, now Pat. No. 7,027,190.

(30) Foreign Application Priority Data

| Sep. 27, 2000 | (JP) | ............................. 2000-294698 |
| Sep. 29, 2000 | (JP) | ............................. 2000-298663 |
| Sep. 3, 2001 | (JP) | ............................. 2001-266382 |

(51) Int. Cl.
 *G06K 15/00* (2006.01)
(52) U.S. Cl. ...................... 358/3.1; 358/1.16
(58) Field of Classification Search ................ 358/1.16, 358/1.2, 3.1, 3.23, 521, 522, 530, 539; 399/49, 399/303; 347/252; 382/251
 See application file for complete search history.

(56) References Cited

U.S. PATENT DOCUMENTS

| 4,084,259 | A | | 4/1978 | Cahill et al. |
| 4,160,279 | A | * | 7/1979 | Fuwa .......................... 358/474 |
| 4,709,274 | A | | 11/1987 | Tanioka |
| 5,006,937 | A | | 4/1991 | Nonoshita et al. |
| 5,237,675 | A | * | 8/1993 | Hannon, Jr. ................... 710/68 |
| 5,465,160 | A | | 11/1995 | Kamo et al. |
| 5,532,693 | A | * | 7/1996 | Winters et al. ................. 341/51 |
| 5,600,373 | A | * | 2/1997 | Chui et al. ............... 375/240.1 |
| 5,604,499 | A | * | 2/1997 | Miyagoshi et al. ............ 341/67 |
| 5,652,660 | A | * | 7/1997 | Seto et al. .................... 358/300 |
| 5,684,611 | A | | 11/1997 | Rakuljic et al. |

(Continued)

FOREIGN PATENT DOCUMENTS

DE    28 12 821 A1    10/1978

(Continued)

*Primary Examiner*—Jerome Grant, II
(74) *Attorney, Agent, or Firm*—Dickstein Shapiro LLP

(57) ABSTRACT

In an image-processing apparatus, a digital image signal is stored in a memory, and a memory access control part entirely manages all accesses to the memory with respect to the digital image signal. An image processing part converts the digital image signal stored in the memory into an output image signal to be supplied to an imaging unit outputting a visible image based on the output image signal so that a pixel density of the output image signal is higher than a pixel density of the digital image signal read from the memory and an amount of the output image signal is less than an amount of the digital image signal stored in the memory. Accordingly, the central controlled memory is shared by a plurality of functions so as to effectively use the memory, and a high-quality image can be produced by carrying out a density conversion so as to match the pixel density.

8 Claims, 22 Drawing Sheets

U.S. PATENT DOCUMENTS

| | | | | |
|---|---|---|---|---|
| 5,715,329 A | * | 2/1998 | Murata | 382/166 |
| 5,802,209 A | | 9/1998 | Hattori et al. | |
| 5,828,396 A | * | 10/1998 | Seto et al. | 347/111 |
| 5,946,523 A | * | 8/1999 | Fujioka et al. | 399/49 |
| 6,317,220 B1 | | 11/2001 | Fujita et al. | |
| 6,643,031 B1 | * | 11/2003 | Takano et al. | 358/1.9 |
| 7,245,314 B2 | * | 7/2007 | Ono | 347/252 |
| 2002/0154327 A1 | * | 10/2002 | Jones | 358/1.12 |
| 2003/0182605 A1 | * | 9/2003 | Short et al. | 714/718 |
| 2005/0219620 A1 | * | 10/2005 | Ohshita | 358/3.01 |

FOREIGN PATENT DOCUMENTS

| | | | |
|---|---|---|---|
| EP | 0 343 644 A2 | | 11/1989 |
| EP | 0 506 379 A2 | | 3/1992 |
| EP | 0555064 | * | 8/1993 |
| EP | 0555064 A1 | * | 8/1993 |
| EP | 0 705 026 A1 | | 4/1996 |
| EP | 0 853 419 A2 | | 7/1998 |
| JP | 09275494 | * | 10/1997 |
| JP | 10-064429 | | 9/1999 |
| JP | 10-226179 | | 2/2000 |
| JP | 11-062055 | | 9/2000 |
| JP | 02002176554 A | * | 6/2002 |

* cited by examiner

FIG. 20
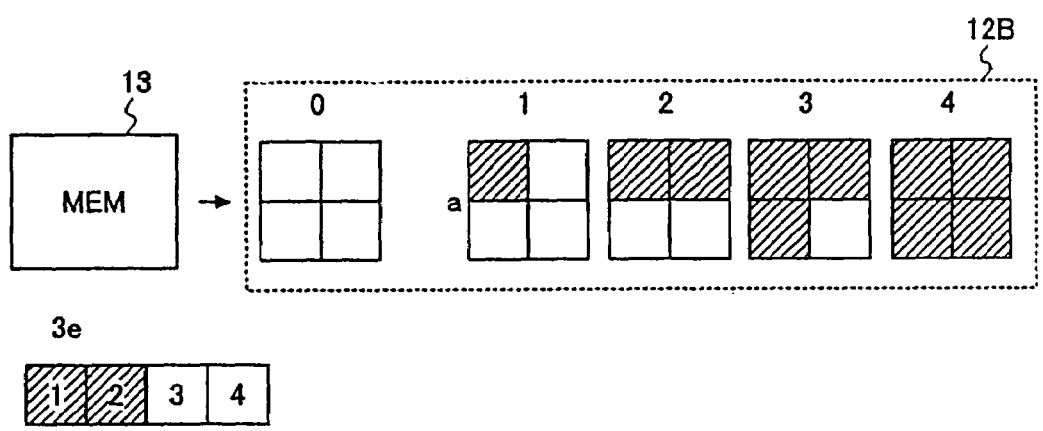
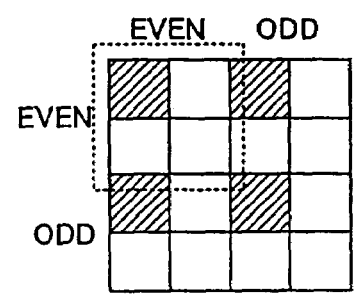
501

IMAGE-PROCESSING APPARATUS, IMAGE-PROCESSING METHOD AND RECORDING MEDIUM

This is a continuation application of U.S. patent application Ser. No. 09/960,944, filed on Sep. 25, 2001 now U.S. Pat. No. 7,027,190, the entire disclosure of which is incorporated by reference herein.

BACKGROUND OF THE INVENTION

1. Field of the Invention

The present invention generally relates to image processing apparatuses and, more particularly, to an image-processing apparatus which converts read image into recordable image signal after changing the read image to digital image signals.

2. Description of the Related Art

Conventionally, multi-function apparatuses provided with a plurality of functions, such as a so-called copy function including reading of an image, a record output or transmission and reception of image data, a facsimile function, a printer function, a scanner function, etc., are known. A conventional multi-function apparatus (MFP) 100 shown in FIG. 1 comprises a facsimile control unit (FCU) 101, a printer control unit (PCU) 102, a motherboard 103, a reading unit 104, an image-processing unit 105, a video control part 106, an imaging unit 107, a memory control unit 108, a system controller 109, a random access memory (RAM) 110 and a read only memory (ROM) 111. The PCU 102 comprises, as shown in FIG. 2, a memory access control part (IMAC) 121, a network interface (I/F) 122, a system controller 123, a local bus interface (I/F) 124, a parallel bus interface (I/F) 125, a memory group (MEM) 126 and a serial bus interface (I/F) 127.

In the multi-function apparatus. (MFP) 100, after the reading unit 104 optically reads an image of an original and changes the read image into a digital image signal, the reading unit 104 outputs the digital image signal to the image-processing unit 105. The imaging unit 107 forms a reproduction image on a transfer paper based on the digital image signal from the video bus control part 106.

The image-processing unit 105 applies various image quality processes, such as correction of image degradation in the reading system of the reading unit 104 and gradation reproduction by an area gradation method, to the image signal, and outputs the processed image signal to the video control part 106. The video control part 106 performs a bus control, and arbitrates an incoming signal from the image-processing unit 105, an output signal to the imaging unit 107, an input-and-output signal to the memory control unit 108, and an input-and-output signal with the FCU 101 and the PCU 102 which are external application units connected through the motherboard 103.

An external extension application unit can connect a plurality of applications to the motherboard 103. Each application has a CPU and a memory, and functions as an independent unit. For example, the FCU (facsimile control unit) 101 and the PCU (printer control unit) 102 correspond to the applications. Regarding the job using a memory, such as image rotation by the copy function, after the MFP 100 stores the image data from the image-processing unit 105 in the memory control unit 108 via the video control part 106 and performs image rotation processing, the MFP 100 carries out image reproduction in the imaging unit 107 via the video control part 106. The MFP 100 carries out the series of controls by the system controller 109. On the other hand, regarding a deployment process on the memory of the printer output image by the PCU 102, the system controller 109 and the memory control unit 108 do not use the MFP 100, but uses uniquely the system controller 124 and the memory group 126 provided in the PCU 102 shown in FIG. 2.

In the PCU 102 shown in FIG. 2, the system controller 124 controls an operation of the entire PCU 102 so that the PCU 102 operates as a single unit as a whole. That is, the memory which can be used by the PCU 102 is only the memory group 126 inside the PCU 102. Such a composition of the PCU 102 is the same as the FCU 101. If data is sent to the PCU 102 via a network, print output request data is taken in the IMAC 121 through the network I/F 122.

When a general-purpose serial bus connection is used, the system controller 123 receives the print output request data supplied to the IMAC 121 via the serial bus I/F 127. Usually, a plurality of kinds of interfaces are provided as the general-purpose serial bus I/F 127 so as to cope with interfaces such as USB, IEEE1284 and IEEE1394. The system controller 123 develops the received print output request data to image data in an area within the MEM 126. At this time, font data of a font ROM (not illustrated in the figure) connected to the local bus concerned is referred to via the local bus I/F 124 and a local bus.

A serial bus connected to the serial bus I/F 127 is also provided with an interface (I/F) for data transmission with an operation part of the MFP 100 in addition to an external serial port for connection with a personal computer. Unlike print deployment data, the operation part of the MFP 100 communicates with the system controller 123 via the IMAC 121.

The system controller 123 controls reception of the processing procedure from the operation part and the display of the state of the system on the display part. The local bus connected to local bus I/F 124 is connected to the ROM and RAM required for control of the controller unit. Font data is input through the local bus and used for image deployment.

In the above-mentioned conventional multi-function apparatus (MFP), a memory is not used effectively and communization of a control mechanism including extended units is not made. That is, each of the facsimile control unit (FCU) and the printer control unit (PCU) has individually a system control module, a memory module and a memory control module. Accordingly, each control unit performs a similar control separately, and, thereby, effective use of resources is not achieved. Therefore, the apparatus is enlarged, and a cost is increased. Moreover, it is necessary to improve for increasing a processing speed.

Moreover, in the above-mentioned multi-function apparatus (MFP), in order to realize a high-quality image by a high-densification of dots, it has been suggested to perform a dot position control of writing. This is for the reason that a single dot reproduction with high-density dots needs a high technology, and, on the other hand, a stable and smooth gradation can be obtained by concentrating dots. However, depending on the kind of image, a very thin line, for example, is crushed when dots are concentrated. In such a case, it is necessary to perform a signal processing to cause a single isolated dot reproduced.

On the other hand, it has been suggested to attain a high quality output image by performing writing with a higher density than a reading density. For example, a process has been suggested to read by 600 dpi and write by 1200 dpi. If a single pixel of 600 dpi is converted into five values by half-tone processing, the pixel data becomes 33-bit data. If this data is converted into a binary value of 1200 dpi by a high-density conversion, the data becomes 4-bit data. That is, an amount of image data increases by the high-densification conversion. Furthermore, when information of the above-mentioned pixel arrangement is added, the amount of information increases further and there is a problem in that a processing speed is decreased. Japanese Laid-Open Patent Application No. 6-12112 discloses a technology to reduce an amount of data by encoding image data. However, the technology disclosed in Japanese Laid-Open Patent Application No. 6-12112 relates to an exchange of image data with external equipment, such as a printer or a facsimile machine, and does not relate to encoding of high-density data for data transmission inside a processing apparatus.

SUMMARY OF THE INVENTION

It is a general object of the present invention to provide an image processing apparatus and method in which the above-mentioned problems are eliminated.

A more specific object of the present invention is to provide an image-processing apparatus and method in which a central-controlled memory is shared by a plurality of functions so as to effectively use the memory.

Another object of the present invention is to provide an image-processing apparatus and method which is inexpensive and small and can produce a high-quality image by carrying out a density conversion so as to match the pixel density.

A further object of the present invention is to provide an image-processing apparatus and method and a recording medium storing a process program to carry out the image-processing method, which can efficiently perform data processing by encoding high-density data within the image-processing apparatus.

In order to achieve the above-mentioned objects, there is provided according to one aspect of the present invention an image-processing apparatus comprising: a memory storing a digital image signal; a memory access control part entirely managing all accesses to the memory with respect to the digital image signal; and an image processing part converting the digital image signal stored in the memory into an output image signal to be supplied to an imaging unit outputting a visible image based on the output image signal so that a pixel density of the output image signal is higher than a pixel density of the digital image signal read from the memory and an amount of the output image signal is less than an amount of the digital image signal stored in the memory.

According to the above-mentioned invention, the central controlled memory is shared by a plurality of functions so as to effectively use the memory, and a high-quality image can be produced by carrying out a density conversion so as to match the pixel density. Additionally, the image-processing apparatus according to the present invention is inexpensive and small and can effectively use resources.

The image-processing apparatus according to the present invention may further comprise a programmable operation processor processing the digital image signal so as to reduce a number of quantization steps of the digital image signal and store the digital image signal having a reduced number of quantization steps in the memory. Accordingly, an arbitrary image processing can be applied to the read image data so as to improve the image quality and also the data transmission efficient can be improved.

Additionally, the memory access control part may arrange pixels of the output image signal in a square area while preventing generation of an isolated single pixel of black or white when converting the digital image data into the output image data. Accordingly, the number of pixels can be increased in both the main scanning direction and the sub-scanning direction at the same time, which results in a high efficiency pixel-density conversion.

Further, the memory access control part may include a pixel density conversion part converting the digital image signal by using the memory; and the image processing part may include an edge smoothing part smoothing an edge of black pixels and white pixels, wherein the edge smoothing part is controlled, separately from the pixel density conversion part, by a write-in control performed by the imaging unit. Accordingly, the smoothing process depending on the characteristics of the imaging unit and the pixel-density conversion are performed independently from each other so as to reduce a processing time of the pixel-density conversion. Thus, a further higher-quality image can be produced for a short time.

Additionally, the output image signal may be transmitted from the memory to the imaging unit in a form of code data, and the imaging unit may convert the code data into pixel data so as to perform an image output under the write-in control of the imaging unit. Accordingly, The data transmission from the memory to the imaging unit can be effectively performed in a short time, and the data bus is effectively used. Thus, a further efficient processing can be performed at a high speed.

Additionally, transmission of the code data from the memory to the imaging unit is performed in synchronization with a signal indicating a write-in line of the code data. Accordingly, the image data can be transmitted only when it is needed in accordance with a request by the imaging unit. Thus, a bus-occupancy time can be reduced, which improves a total efficiency of memory use and bus use.

Additionally, there is provided according to another aspect of the present invention an image-processing method comprising the steps of: storing a digital image signal in a memory; entirely managing all accesses to the memory with respect to the digital image signal; and converting the digital image signal stored in the memory into an output image signal to be supplied to an imaging unit outputting a visible image based on the output image signal so that a pixel density of the output image signal is higher than a pixel density of the digital image signal read from the memory and an amount of the output image signal is less than an amount of the digital image signal stored in the memory.

According to the above-mentioned invention, the central controlled memory is shared by a plurality of functions so as to effectively use the memory, and a high-quality image can be produced by carrying out a density conversion so as to match the pixel density. Additionally, the image-processing apparatus according to the present invention is inexpensive and small and can effectively use resources.

Additionally, there is provided according to another aspect of the present invention a processor readable medium storing program code for causing an image-processing apparatus to perform an image processing, comprising: program code means for storing a digital image signal in a memory; program code means for entirely managing all accesses to the memory with respect to the digital image signal; and program code means for converting the digital image signal stored in the memory into an output image signal to be supplied to an imaging unit outputting a visible image based on the output image signal so that a pixel density of the output image signal is higher than a pixel density of the digital image signal read from the memory and an amount of the output image signal is less than an amount of the digital image signal stored in the memory.

According to the above-mentioned invention, the central controlled memory is shared by a plurality of functions so as to effectively use the memory, and a high-quality image can be produced by carrying out a density conversion so as to match the pixel density. Additionally, the image-processing apparatus according to the present invention is inexpensive and small and can effectively use resources.

Additionally, there is provided according to another aspect of the present invention an image-processing apparatus having a frame memory controlled by a memory controller, comprising: a scanner reading an image so as to produce read image data; a pixel density conversion part converting the read image data into high-density image data having a pixel density higher than a pixel density of the read image data; a memory storing the high-density image data according to a predetermined arrangement of pixels; a code conversion part converting the high-density image data into code data according to a predetermined conversion code; and an output interface part outputting code data as image data to an imaging unit forming a visible image based on the image data.

According to the above-mentioned invention, since the high-density imaged data is transmitted by reducing the amount of data by encoding, the data transmission efficiency is improved and a high-speed image processing can be achieved.

In the image-processing apparatus according to the above-mentioned invention, the code conversion part may decide an ON/OFF position of pixel data of the image data output from the output interface part, and the output interface part may change pixel positions of the high-density image data based on pixel positions of the read image data. Accordingly, a dot control matching the characteristics of an image can be performed with a reduced amount of data, and a high-quality image can be produced.

Additionally, the code conversion part may set the pixel positions of the high-density image data based on information regarding characteristics of the read image data. Accordingly, a dot control matching the characteristics of an image can be performed with a reduced amount of data, and a high-quality image can be produced.

There is provided according to another aspect of the present invention an image-processing method comprising the steps of: reading an image so as to produce read image data; converting the read image data into a high-density image data having a pixel density higher than a pixel density of the read image data; storing the high-density image data in a memory according to a predetermined arrangement of pixels; converting the high-density image data into code data according to a predetermined conversion code; and outputting code data as image data to an imaging unit forming a visible image based on the image data.

According to the above-mentioned invention, since the high-density imaged data is transmitted by reducing the amount of data by encoding, the data transmission efficiency is improved and a high-speed image processing can be achieved.

In the image-processing method according to the above-mentioned invention, the step of converting the high-density image data may include a sep of deciding an ON/OFF position of pixel data of the image data, and the step of outputting code data may include a step of changing pixel positions of the high-density image data based on pixel positions of the read image data.

Additionally, the step of converting the high-density image data may include a step of setting the pixel positions of the high-density image data based on information regarding characteristics of the read image data.

There is provided according to another aspect of the present invention, a processor readable medium storing program code for causing an image-processing apparatus to perform an image processing, comprising: program code means for reading an image so as to produce read image data; program code means for converting the read image data into a high-density image data having a pixel density higher than a pixel density of the read image data; program code means for storing the high-density image data in a memory according to a predetermined arrangement of pixels; program code means for converting the high-density image data into code data according to a predetermined conversion code; and program code means for outputting code data as image data to an imaging unit forming a visible image based on the image data.

According to the above-mentioned invention, since the high-density imaged data is transmitted by reducing the amount of data by encoding, the data transmission efficiency is improved and a high-speed image processing can be achieved.

In the processor readable medium, the program code means for converting the high-density image data may include program code means for deciding an ON/OFF position of pixel data of the image data, and the program code means for outputting code data may include program code means for changing pixel positions of the high-density image data based on pixel positions of the read image data.

Additionally, the program code means for converting the high-density image data may include program code means for setting the pixel positions of the high-density image data based on information regarding characteristics of the read image data.

Other objects, features and advantages of the present invention will become more apparent from the following detailed descriptions when read in conjunction with the accompanying drawings.

BRIEF DESCRIPTION OF THE DRAWINGS

FIG. 20 is an illustration of another example of the operation performed by the code conversion part of the IMAC shown in FIG. 17;

DETAILED DESCRIPTION OF THE PREFERRED EMBODIMENTS

A description will now be given, with reference to accompanying drawings, of preferred embodiments of the present invention.

First Embodiment

Figure 1:
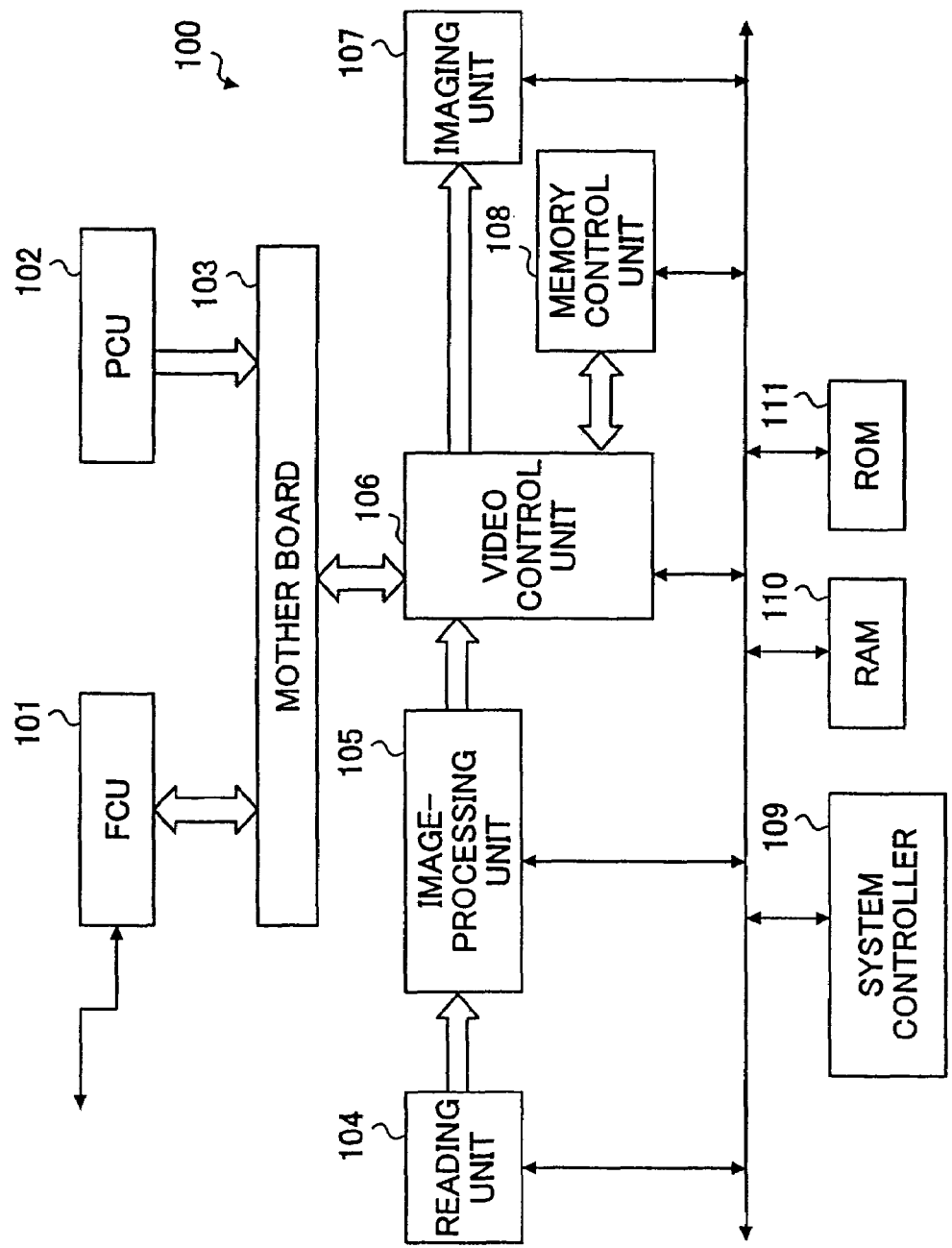
FIG. 1 is a block diagram of a conventional multi-function apparatus.
Figure 2:
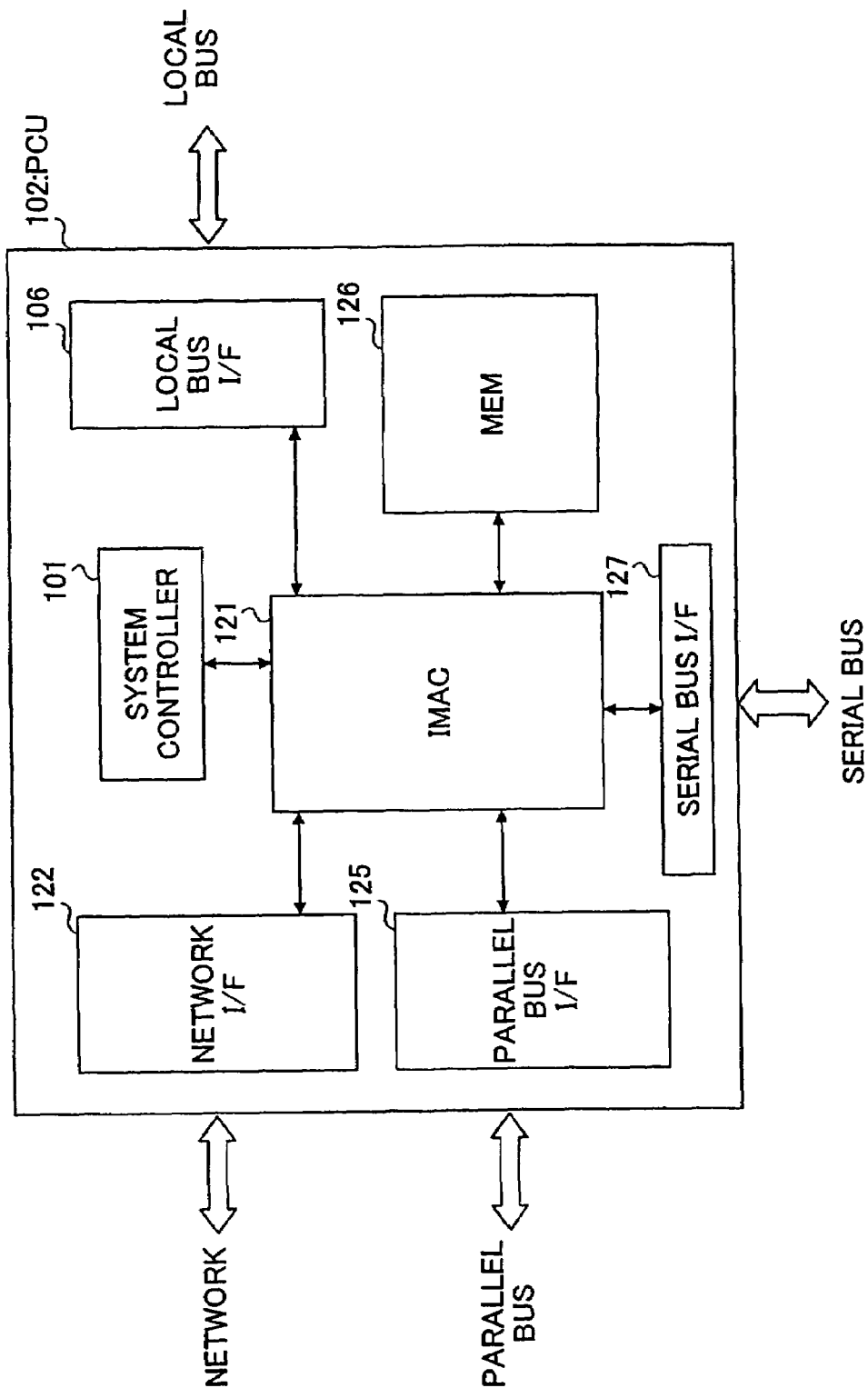
FIG. 2 is a block diagram of a printer control unit shown in FIG. 1.
Figure 3:
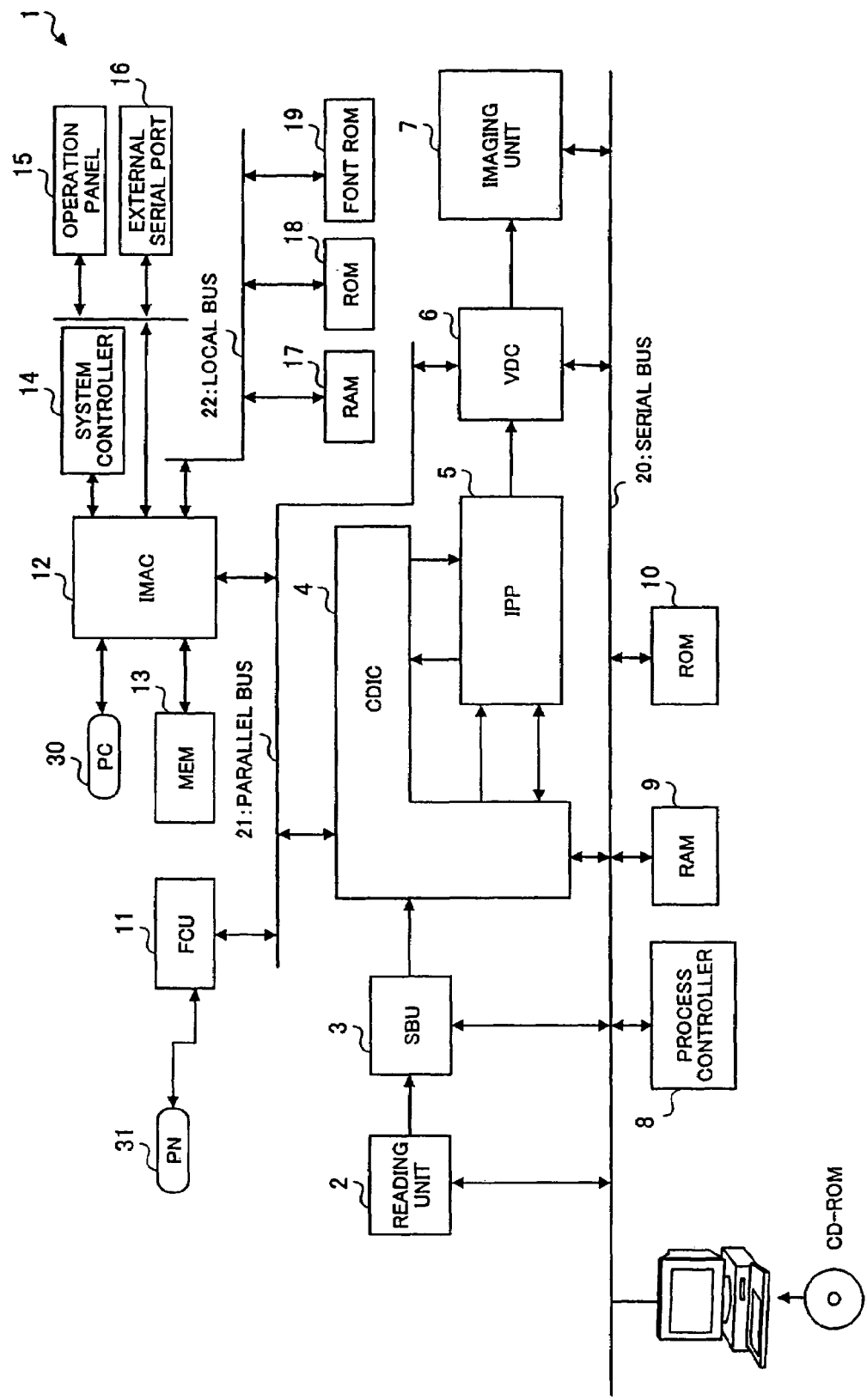
FIG. 3 is a circuit block diagram of a multi-function apparatus (MFP) according to a first embodiment of the present invention.

FIG. 3 through FIG. 16 show an image-processing apparatus and method and a recording medium according to a first embodiment of the present invention. FIG. 3 is a circuit block diagram of a multi-function apparatus (MFP) 1 according to the first embodiment of the present invention.

In FIG. 3, the MFP 1 comprises: a reading unit 2; a sensor board unit 3 (SBU); a compression/decompression and data interface control part (CDIC) 4; an image-processing processor (IPP) 5; a video data control part (VDC) 6; an imaging unit 7, a process controller 8; a random access memory (RAM) 9; a read only memory (ROM) 10; a facsimile control unit (FCU) 11; an image memory access control part 12 (IMAC); a memory group (MEM) 13; a system controller 14; an operation panel 15; an external serial port 16; a RAM 17; a ROM18; and a font ROM 19. The reading unit 2, the SBU 3, the CDIC 4, the IPP 5, the VDC 6, the imaging unit 7, the process controller 8, the RAM 9 and the ROM 10 are connected to the serial bus 20. The FCU 11, the IMAC 12, the CDIC 4 and the VDC 6 are connected to the parallel bus 21. Moreover, the IMAC 12, the RAM 17, the ROM18, and the font ROM 19 are connected to the local bus 22.

The MFP 1 has various mode functions, such as a scanner mode, a copy mode, a facsimile mode, and a printer mode. In the scanner mode or copy mode of the MFP 1, a reading unit 2 irradiates a reading light from a light source onto an original and a light-receiving elements, such as a charge coupled device (CCD), which SBU 3 provided through the mirror and the lens, condense the catoptric light from an original. In the scanner mode or copy mode of the MFP 1, the reading unit 2 irradiates a reading light from a light source onto an original, and converges the reading light reflected by the original onto a light-receiving element, such as a charge coupled device (CCD) provided to the SBU 3, via a mirror and a lens. By carrying out an optoelectric conversion by the light-receiving element concerned so as to read the original in a primary scanning direction, a digital conversion of the image signal is carried out by the SBU 3 so as to produce and outputs the digital image signal to the CDIC 4.

The CDIC 4 controls all transmissions of image data between a functional device and a data bus, and performs data transmission between the SBU 3, the parallel bus 21 and the IPP 5. Moreover, the CDIC 4 performs communication between the system controller 14, which controls the entire MFP 1, and the process controller 8, which performs processing control to image data. The CDIC 4 transfers the image signal from the SBU 3 to the IPP 5, and the IPP 5 corrects a signal degradation (signal degradation of a scanner system) in the optical system and that accompanying the quantization to an optical system. The IPP 5 outputs the image signal to the CDIC 4 again.

In the image processing, the MFP 1 has a job to accumulate and reuse image data (read image data etc.) in a memory and a job which is carried out without accumulating image data in a memory. In an example of the job to accumulate image data in a memory, the reading unit 2 is operated only once, when copying a plurality of originals, so as to store the image data in the memory, the image data is used a plurality of times by reading the image data stored in the memory. As an example without using a memory, there is a case in which only one copy of one original is carried out, for example. In this case, since what is necessary is just to reproduce read image data as it is, it is not necessary to perform a memory access.

When not using a memory, the MFP 1 returns the data, which has been transmitted to the CDIC 4 from the IPP 5, to the IPP 5 from the CDIC 4 as mentioned above. The IPP 5 performs an image quality processing for converting luminance data of a light-receiving element into area gradation data. The IPP 5 transmits the image data after being subject to the image quality processing to the VDC 6. The VDC 6 performs a pulse control with respect to the signal which has been changed to the area gradation data so as to perform a post-processing on a dot arrangement and reproduce dots. In the imaging unit 7 as a writing means, a reproduction image is formed on a transfer paper. As an imaging unit 7, although units of various record systems can be used, a unit of an electrophotography system is used, for example.

When performing an additional processing, for example, rotation of an image orientation, synthesis of an image, etc. by using a memory, the MFP 1 sends the data, which has been transmitted to the CDIC 4 from the IPP 5, from the CDIC 4 to the IMAC 12 via the parallel bus 21. The IMAC 12 performs an access control of the image data and the MEM 13 under a control of the system controller 14. Moreover, the IMAC 12 develops the print data of the externally connected personal computer (PC) 30. Furthermore, the IMAC 12 performs compression/decompression of the image data for effectively using the memory. Namely, the PC 30 is connected to the IMAC 12, and under control of the system controller 14, the IMAC 12 receives the digital print data of the PC 30 and develops the print data on the MEM 13. After the IMAC 12 carries out the data compression of the data, the IMAC 12 accumulates the compressed data to the MEM 13. Moreover, after decompressing the accumulated data, which is read from the MEM 13 when it is needed, the decompressed data is transferred to the CDIC 4 via the parallel bus 21. The MFP 1 transmits the data transferred to the CDIC 4 to IPP 5 from the CDIC 4, and cause the IPP 5 to perform the image quality processing for converting the luminance data of the light-receiving element into area gradation data. The IPP 5 transmits the image data after image quality processing to the VDC 6, and performs a pulse control on the signal which has been changed to the area gradation data by the VDC 6 for the post-processing regarding the dot arrangement and reproducing dots. Then, the IPP 5 forms a reproduction image on the transfer paper in the imaging unit 7. That is, by a bus control of the parallel bus 21 and the CDIC 4, the MFP 1 performs accumulation of data to MEM13 and various transmission processings of data so as to achieve the function as the MFP 1.

Moreover, the public line (PN) 31 is connected to the FCU 11. The MFP 1 realizes facsimile transmission and reception function by utilizing the FCU 11. That is, the MFP 1 transmits the image data read by the reading unit 2 to the IPP 5 as mentioned above at the time of facsimile transmission. The image data is transmitted to the FCU 11 via the CDIC 4 and the parallel bus 21, after a required image processing is performed in the IPP 5. The FCU 11 performs data conversion to a communications network, and transmits the data to the PN 31 as facsimile data. At the time of facsimile reception, the MFP 1 converts the facsimile data, which is transmitted from the PN 31 and received by the FCU 11, into image data, and transmits the image data to the IPP 5 via the parallel bus 21 and the CDIC 4. In this case, the IPP 5 does not perform any special image quality processing on the transmitted image data, but transmits the received image data to the VDC 6. Then, dot rearrangement and pulse control are performed by the VDC 6, and a reproduction image is formed on the transfer paper in the imaging unit 7. The system controller 14, the operation panel 15, and the external serial port 16, etc. are connected to the IMAC 12. The system controller 14 controls the whole MFP 1. Various keys, a display part, etc. are provided in the operation panel 15 so as to perform various instructing operations to the MFP 1. The system controller 14 performs a basic processing as the MFP 1 and a memory control process processing by controlling each part of the MFP 1 according to instructing operations through the operation panel 15. Moreover, the MFP 1 has a function to concurrently perform a plurality of jobs such as a copy function, a facsimile transceiver function, a printer output function, etc. When processing a plurality of jobs in parallel, the right to use the reading unit 2, the imaging unit 7, and the parallel bus 21 is assigned to the jobs. This assignment is controlled by the system controller 14 and the process controller 8.

The process controller 8 controls a flow of the image data. The system controller 14 controls the whole system of the MFP 1, and manages activation of each resource. A selection of function of the MFP 1 is performed by a key operation of the operation panel 15. The contents of processing, such as a copy function or a facsimile transceiver function, are set up by the key operation of the operation panel 15.

The system controller 14 and the process controller 8 communicate mutually through the parallel bus 21, the CDIC 4 and the serial bus 20 so as to perform a data format conversion for the data interface between the parallel bus 21 and the serial bus 20 in the CDIC 4.

Figure 4:
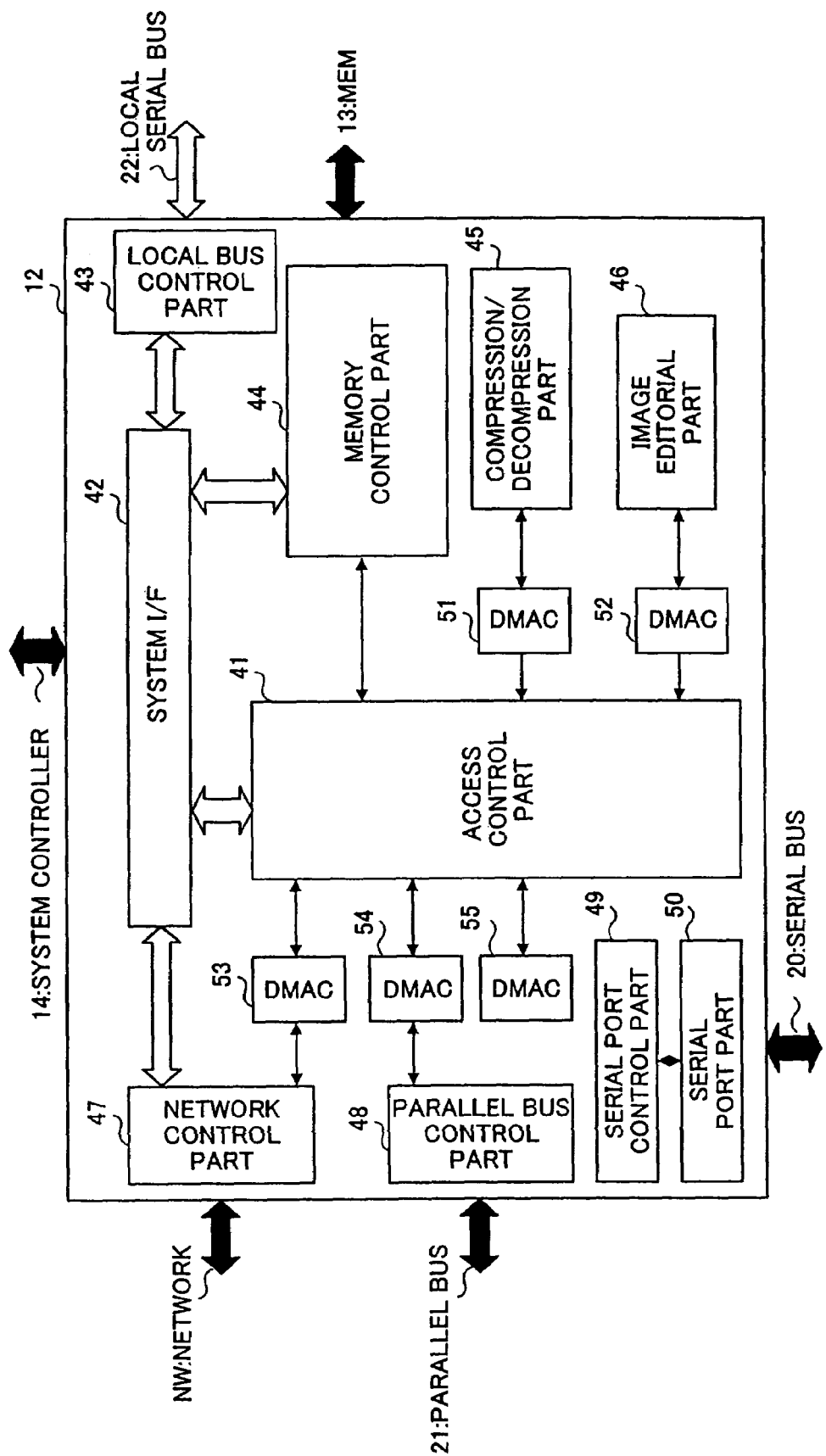
FIG. 4 is a block diagram of an image memory access control part (IMAC) shown in FIG. 3.

As shown in FIG. 4, the IMAC 12 comprises an access control part 41, a system I/F 42, a local bus control part 43, a memory control part 44, a compression/decompression part 45, an image editorial part 46, a network control part 47, a parallel bus control part 48, a serial port control part 49, a serial port 50 and direct memory access control parts (DMAC) 51-55. The direct memory access control parts (DMAC) 51-55 are provided between the access control part 41 and each of the compression/decompression part 45, the image editorial part 46, the network control part 47, the parallel bus control part 48 and the serial port control part 49.

The IMAC 12 is connected to the system controller 14 through the system I/F 42 so as to perform transmission and reception of commands and data with the system controller 14 through the system I/F 42. As mentioned above, the system controller 14 basically controls the entire operation of the MFT 1. The resource allocation of the memories of the memory group 13 is also under management of the system controller 14. Control of operations of other units is performed in the parallel bus 21 through the system I/F 42 and the parallel bus control part 48.

Each unit of the MFP 1 is fundamentally connected to the parallel bus 21, and the data transmission and reception to the system controller 14 and the memory group 13 are managed by the parallel bus control part 48 controlling bus occupancy.

The network control part 47 is connected to a predetermined network NW such as a local area network (LAN). The network control part 47 controls connection with the network NW, and manages data transmission and reception with external extension devices connected to the network NW. The system controller 14 is not involved in the management of operations of the extension devices connected to the network NW. The system controller 14 controls the interface on the side of the IMAC 12. In addition, the control with respect to 100BT is added in the present embodiment. The IMAC 12 interfaces the connection with the serial bus 20 through a plurality of serial ports 50, and has port control mechanisms corresponding to the number of kinds of busses. Namely, the IMAC 12 has the serial ports whose number corresponds to the number of kinds of busses such as, for example, USB, IEEE1284 and IEEE1394. The serial port control part 49 performs controls of those ports. Moreover, the serial port control part 49 controls, separately from the external serial port 50, the data transmission and reception with the operation panel 15 with respect to reception of commands and display.

The local bus control part 43 interfaces with the RAM 17 and the ROM 18, which are needed to activate the system controller 14, and also interfaces with the local (serial) bus 22 to which the font ROM 19 which develops printer code data is connected. The memory control part 44 is connected with the MEM 13 so as to interfaces with the MEM13.

The access control part 41 controls operations by carrying out a command control sent from the system controller 14 through the system I/F 42. Moreover, the access control part 41 performs data control centering on the MEM 13 by managing a memory access from an external unit. That is, the image data to the IMAC 12 from the CDIC 4 is transmitted through the parallel bus 21, and is taken in the IMAC 12 by the parallel bus control part 48. The image data taken in the IMAC 12 leaves management of the system controller 14 in the DMAC 54. Thereby, memory access is performed independently from the system control. The access control part 41 arbitrates the access to the MEM 13 from a plurality of units. The memory control part 44 controls an access operation and a data reading and writing operation to the MEM13.

Moreover, in the IMAC 12, an access from the network NW to the MEM 13 is also performed by accessing the MEM 13 through the DMAC 53 with the data taken in the IMAC 12. Then, the access control part 41 arbitrates accesses to the MEM 13 in a plurality of jobs, and the memory control part 44 performs reading/writing of data.

Furthermore, the IMAC 12 performs an access to the MEM 13 from the serial bus 20 by accessing the data taken in the IMAC 12 through the serial port 50 by the serial port control part 49 by the DMAC 55. The IMAC 12 arbitrates accesses to the MEM 13 in a plurality of jobs in the access control part 41, and performs reading/writing of data in the memory control part 44. Then, in the MFP 1, if the print data of the PC 30 is sent from the network NW or the serial bus 20, the system controller 14 develops print data in the memory area of the MEM 13 using the font data of the font ROM 19 on the local bus 22.

In MFP 1, the system controller 14 manages an interface with each external unit. Then, each DMAC 51-55 in the IMAC 12 manages memory access. In this case, since each DMAC 51-55 performs data transmission independently, the access control part 41 performs priority attachment with respect to the collision of jobs and each access request with respect to the access to the MEM 13. Accesses to the MEM 13 include an access of the system controller, other than the accesses by each DMAC 51-55, through the system I/F 42 for bit map deployment of stores data. The data of DMAC to which the access control to the MEM 13 is permitted, or the data from the system I/F 42 is performed by a direct access to the MEM 13 by the memory control part 44.

The IMAC 12 performs a data processing by the compression/decompression part 45 and the image editorial part 46. That is, the compression/decompression part 45 performs a compression and a decompression of data by a predetermined compression system so as to accumulate image data or code data efficiently to the MEM 13. The data compressed by the compression/decompression part 45 is stored in MEM 13 by the DMAC 51-55 controlling an interface with the MEM 13.

The IMAC 12 transmits the data once stored in the MEM 13 to the compression/decompression part 45 through the memory control part 44 and the access control part 41 by a control of the DMAC. Then, after decompressing the compressed data, the IMAC 12 performs a control such as returning to the MEM 13 or outputting to an external bus.

Figure 5:
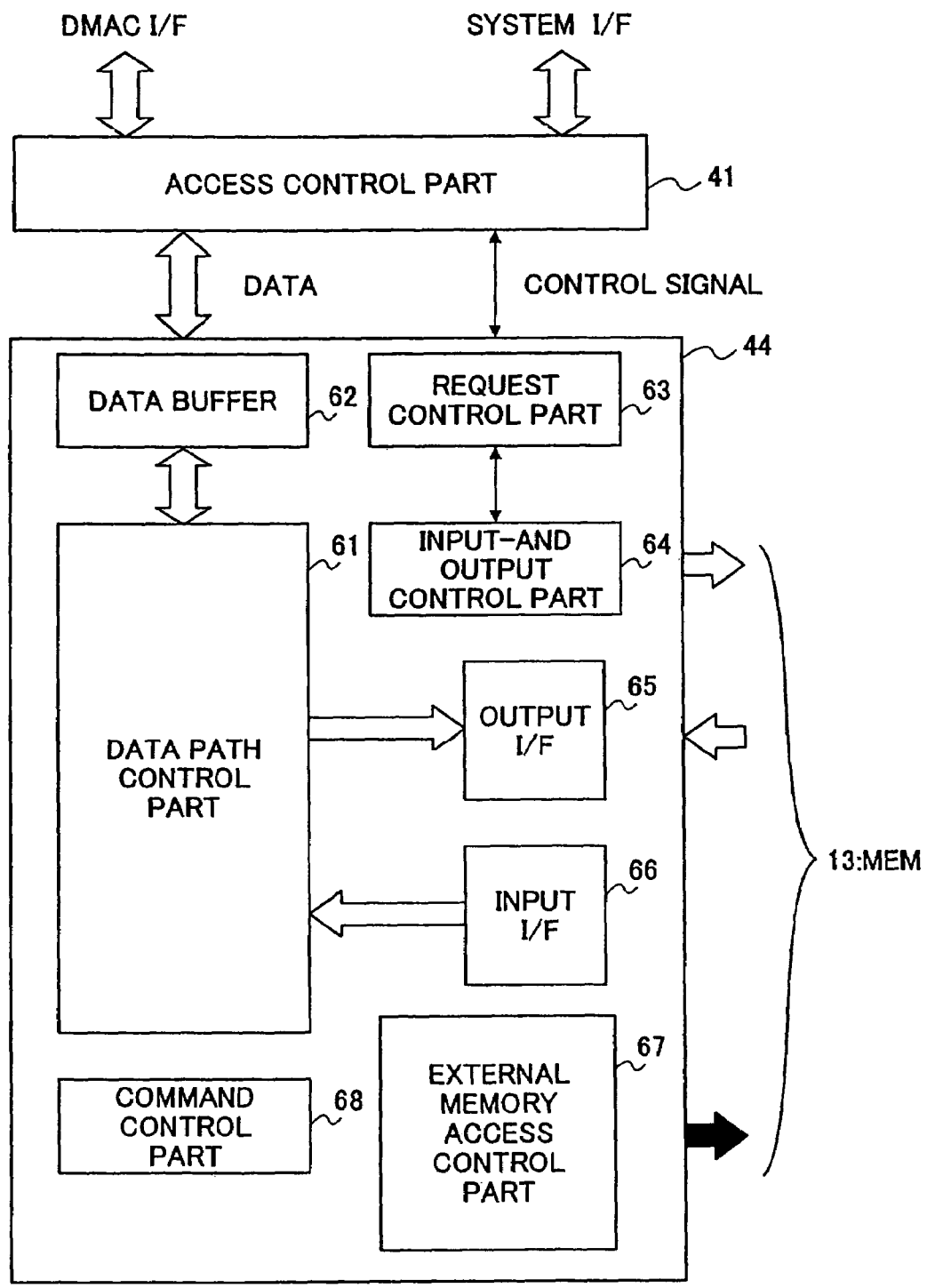
FIG. 5 is a block diagram of a memory control part shown in FIG. 4.

The image editorial part 46 controls the MEM 13 by the DMAC 51-55 so as to clear the memory area in the MEM 13 and perform a data processing such as a rotation of an image or a synthesis of different images. Moreover, the image editorial part 46 performs an address control on the memories of the MEM 13 so as to convert the data to be processed. However, the image editorial part 46 does not perform a conversion of code data after being compressed by the compression/decompression part 45, or conversion into printer code but performs the above-mentioned image processing on a bit map image developed on the MEM 13. That is, the compression process for accumulating data effectively to the MEM 13 is performed after an image edit is performed by the image editorial part 46. The memory control part 44 comprises, as shown in FIG. 5, a data path control part 61, the data buffer 62, a request control part 63, an input-and-output control part 64, an output I/F 65, an input I/F 66, an external memory access control part 67 and a command control part 68. The memory control part 44 transmits and receives data between the access control part 41 and the MEM 13.

The access control part 41 has an interface with each DMAC 51-55. The access control part 41 receives the command for the intervention to the MEM 13 of the system controller 14 to the MEM 13 and access arbitration by being connected to the system I/F 42. Thereby, an access to the MEM 13 is independently attained for the access request to the MEM 13 of the DMACs 51-55 and the system controller 14. Therefore, reading from the MEM 13 and the writing to MEM 13 are attained. Moreover, the access control part 41 judges a priority provided from the system controller 14 with respect to a plurality of competing read requests or write requests, and switching a path to the memory control part 44 and the access control part 41 by a command control from the system controller 14.

Since data maintenance cannot be performed on the DMAC 51-55 which is not permitted to write in the MEM 13, data input from outside cannot be performed, and, therefore, a data input operation of external units is prohibited by a control of the system controller 14.

Output data of the DMAC 51-55 or the system I/F 42 of which access to the MEM 13 is permitted is transmitted to the memory control part 44. Moreover, a command of the permitted system controller 14 is also transmitted to the memory control part 44.

The memory control part 44 temporarily stores in the data buffer 62 the data transmitted from the access control part 41. The data path control part 61 switches a path to the output I/F 65 to the MEM 13. The memory control part 44 performs the control of the path by decoding the command by the system I/F 42 and activating the access of the output I/F 65 to the MEM 13 by the input-and-output control part 64.

The memory control part 44 generates a MEM control signal by the external memory access control part 67 based on control system data sent from the DMACs 51-55 or the system controller 14 so a to perform an address control of the MEM 13. The memory control part 44 transmits the data and the MEM control signal to the MEM 13, and stores the data in the MEM 13. The memory control part 44 reads the data stored in the MEM 13. That is, based on the control system data from the DMAC 51-55 or the system controller 14 to which an access to the MEM 13 is permitted, the memory control part 44 generates the MEM control signal by the external memory access control part 67, and performs an address control of the MEM 13. Then, the memory control part 44 transmits a control signal to the MEM 13 from the external memory access control part 67, and performs a memory read-out processing, and taken in the access data through the I/F 66. The memory control part 44 temporarily stores the data, which is taken in from the MEM 13, in the data buffer 62 by the data path control part 61, and transmits the data to a requesting channel via the-access control part 41.

Figure 6:
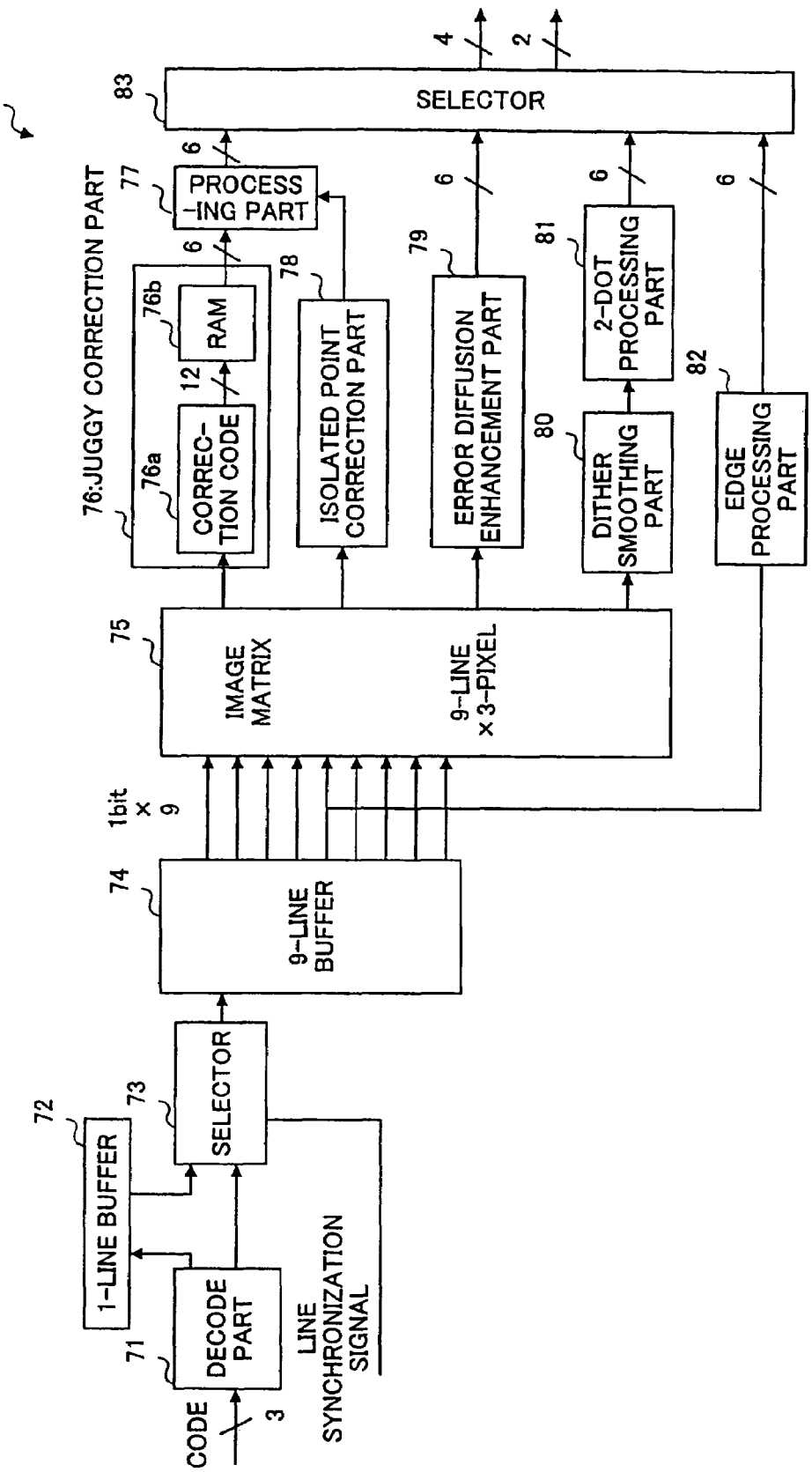
FIG. 6 is a block diagram of a video data control part (VDC) shown in FIG. 3.

The VDC 6 comprises, as shown in FIG. 6, a decoding part buffer 71, a line buffer 72, a selector 73, a 9-line buffer 74, an image matrix 75 of a 9-line×3 pixels, a jaggy correction part.76, a processing part 77, an isolated point correction part 78, an error diffusion enhancement 79 a dither smoothing part 80, an edge processing part 82 and a selector 83. The jaggy correction part 76 is provided with a correction code part 76a and a RAM 76b.

Figure 7:
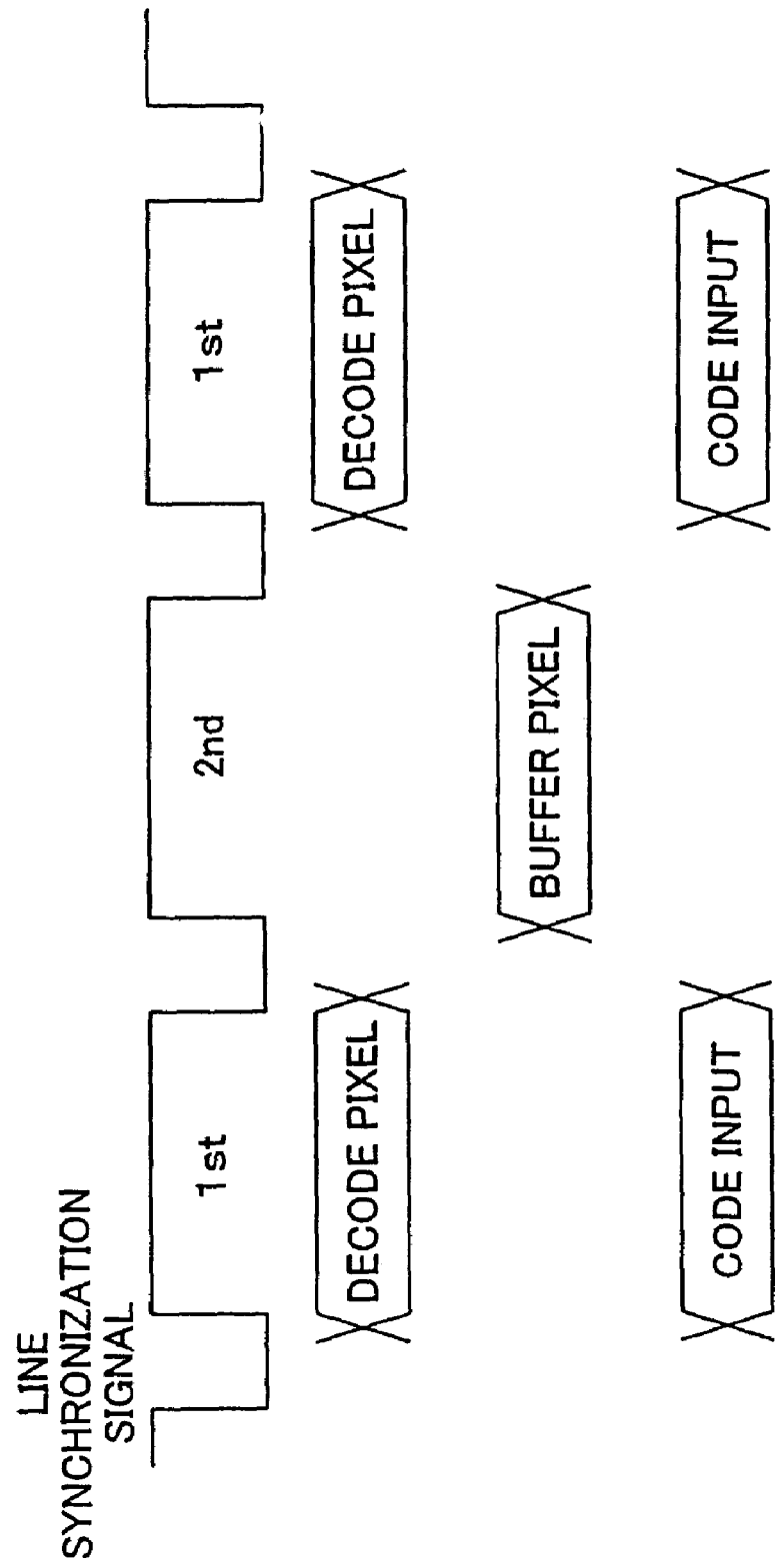
FIG. 7 is an illustration for explaining a switching control of upper pixels or lower pixels decoded in a selector in the VDC shown in FIG. 6.
Figure 8:
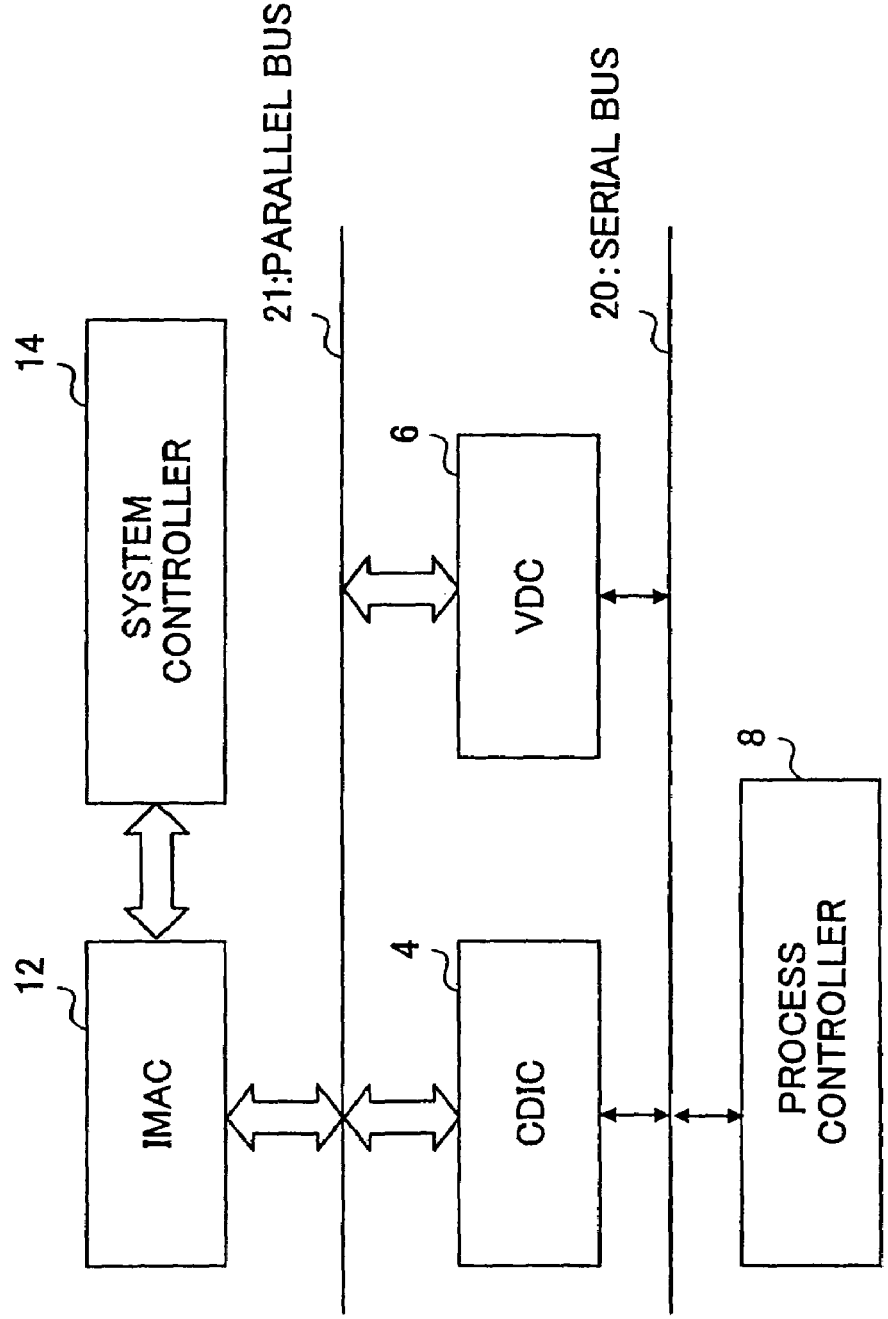
FIG. 8 is an illustration showing a system control and a bus connection in a basic structure of the MFP shown in FIG. 3.

The VDC 6 decodes by the decoding part 71 3-bit encoding data transmitted via the parallel bus 21 from the IMAC 12, and converts the data into pixel data 2×2 pixels. The VDC 6 stores 2 pixels located in the lower row of the converted pixel data in the 1-line buffer 72, and transmits 2 pixels located in the upper row to the selector 73. The selector 73 switches the decoded upper row pixels or lower row pixels in synchronization with a line synchronization signal, and transmits it to the image matrix 75 through the 9-line buffer 74. The VDC 6 performs a control of switching the upper row pixel and the lower row pixel, as shown in FIG. 7. That is, the VDC 6 requests the IMAC 12 to transmit the encoded data for every two lines. At the first line, the decoded upper row pixel is chosen as it is, and the 2 pixels of the lower row are transmitted to the 1-line buffer 72. At the second line which indicates the next image line, the VDC 6 reads the previously stored lower row pixels from the line buffer 72, and uses the pixels for pixel correction.

In addition, the code data treats the pixel information regarding two lines, and latter-part pixels are stored in the line memory while printing the head line. Accordingly, the transmission from IMAC 12 can be performed every other line, and at a line which is not required to transmit, the MFP 1 opens the parallel bus 21 to other processing units so as to improve the data transmission efficiency of the MFP 1.

In the VDC 6, the image matrix 75 creates 13-pixel delay data in the main scanning direction from data of nine lines, respectively, so as to create a 9-line×13-pixel two-dimensional matrix. Although the VDC 6 accesses the matrix data simultaneously so as to carry out a binary value/multi-value conversion processing, the VDC 6 performs, with respect to an edge processing, a process with data on 1 line without using a two-dimensional image matrix.

In the jaggy correction part 76 the correction code part 76*a* performs pattern matching using the arrangement data of the image matrix 75 so as to generate 12-bit code data, and input the code data to the address of the RAM 76*b*. The RAM 76*b* is for image correction, and outputs image correction data corresponding to an input code. It should be noted that the correction data is separately downloaded to the RAM.

The isolated point correction part 78 detects an isolated point by pattern matching in an image area of 9×13 containing an attention pixel. By removing the pixel corresponding to an isolated point or adding pixels to the isolated point within two-dimensional range, the processing part 77 constitutes a set of pixels which are not isolated and outputs the set of pixels to the selector 83. In addition, a mode change is available as to whether a masking is carried out by the processing part 77 or whether pixels are added to the circumference. That is, in a case of an isolated dot, depending on the process conditions of a write-in system, there may be a case in which a dot can be reproduced and a case in which a dot cannot be reproduced, and, thus, unevenness occurs in concentration in an input concentration area, and degradation of image quality is caused. Therefore, a mode change is performed so as to not strike any dot or increase a dot density to the range in which dots can be reproduced stably. The isolated point correction part 78 sets up a central pixel as an attention pixel within the range of the image matrix 75 of 9×13 in detection of an isolated point. As an object of a judgment of whether to be an isolated point regarding the attention pixel concerned, the isolated point correction part 78 judges relation to circumference pixels by pattern matching so as to judge an isolated point. The error diffusion enhancement part 79 smoothes a texture by a band-pass filter holding a line image so as to generate a phase signal based on the pixel row of the main scanning direction, and outputs the phase signal to the selector 83.

The dither smoothing part 80 performs low path filter processing of 5×5, 7×7 and 9×9 on a binary value dither pattern so as to approximately convert into a multi-value signal in false, and outputs the dither pattern to the 2-dot processing part 81. Namely, by applying each smoothing filtering processes of 5×5, 7×7, and 9×9 to the 9-line×13-pixel image matrix 75, the dither smoothing part 80 removes a high-band signal component from the input data which is a 1-bit binary value signal, and outputs it to the 2-dot processing part 81.

The 2-dot processing part 81 performs equalization between adjacent pixels on the signal approximately multi-valued signal so as to generate phase information, and outputs the phase information to the selector 83. That is, the 2-dot processing part 81 equalizes the pixels, which have been smoothed by the dither smoothing part 80, between EVEN pixels and ODD pixels in the main scanning direction. A phase signal is distinguished although this value is an average value. That is, an EVEN pixel is made a right phase and an ODD pixel a left phase so as to form 2-dot image data. Although the 2-dot processing part 81 outputs the phase data to the selector 83 as it is, the 2-dot processing part 81 performs a level conversion on concentration data so as to convert into data having a 4-bit width.

The selector 83 selects an image path according to the mode, and outputs the data, which has been converted into a multi-value from a binary value, as 6-bit data having 4 bits for concentration and 2 bits for phase. The edge processing part 82 performs an edge smoothing processing on data on one line, and outputs the smoothed data to the selector 83. That is, the two-dimensional image matrix 75 is not needed for the process in the edge processing part 82.

A description will now be given of an operation of the present embodiment. The MFP 1 according to the present embodiment effectively uses the MEM 13 by sharing the MEM 13 with each unit.

That is, in the MFP 1, as shown in FIG. 6, the IMAC 12, the CDIC 4 and the VDC 6 are connected to the parallel bus 21, and data transmission between the IMAC 12, the CDIC 4, and the VDC 6 is performed through the parallel bus 21. Moreover, the CDIC 4, the VDC 6, the process controller 8, etc., are connected to the serial bus 20, and data transmission between the CDIC 4, the VDC 6, and the process controller 8 is performed through the serial bus 20. Image data and a command code are transmitted through the parallel bus 21 in a predetermined format without discrimination. In the MFP 1, although the system controller 14 manages the whole control, a direct control of functional modules other than a control of memory related units and the parallel bus 21 is performed by the process controller 8. The process controller 8 is controlled by the system controller 14. The process controller 8 and the system controller 14 communicate with each other according to a relationship between a master and a slave. Format conversion between parallel data and serial data is performed in the CDIC 4 or the VDC 6.

The MFP 1 transmits a control signal of the system controller 14 to the parallel bus 21 through the parallel bus control part 48 in the IMAC 12. After taking in the command data on the parallel bus 21, the CDIC 4 converts parallel data into serial data, and transmits the converted data to the serial bus 20. The process controller 8 connected to the serial bus 20 receives the command data, which is sent from the system controller 14, from the serial bus 20. The process controller 8 controls the CDIC 4 and the VDC 6 via the serial bus 20 based on instructions of the command data. The system controller 14 carries out a system control independently from the process controller 8, while the process controller 8 controls the CDIC 4 or the VDC 6.

Figure 9:
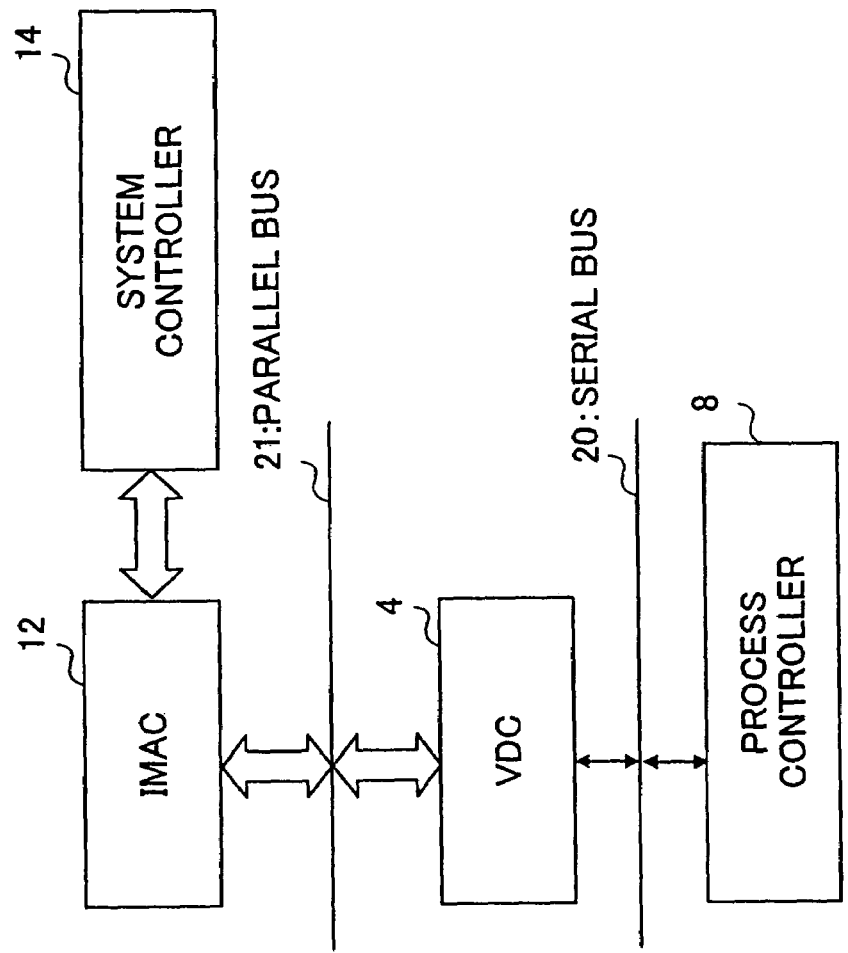
FIG. 9 is an illustration showing the system control and the bus connection of the MFP in a printer mode.

The MFP 1 has various functional modes, such as a copy mode, a printer mode or a facsimile mode. In the printer mode, the MFP 1 serves as a connection composition as shown in FIG. 9. Namely, similar to the case of FIG. 8, the IMAC 12 and the VDC 4, which are connected to the system controller 14, are connected to the parallel bus 21. The VDC 4 and the process controller 8 are connected to the serial bus 20. Therefore, a scanner processing system does not need the CDIC 4.

Figure 10:
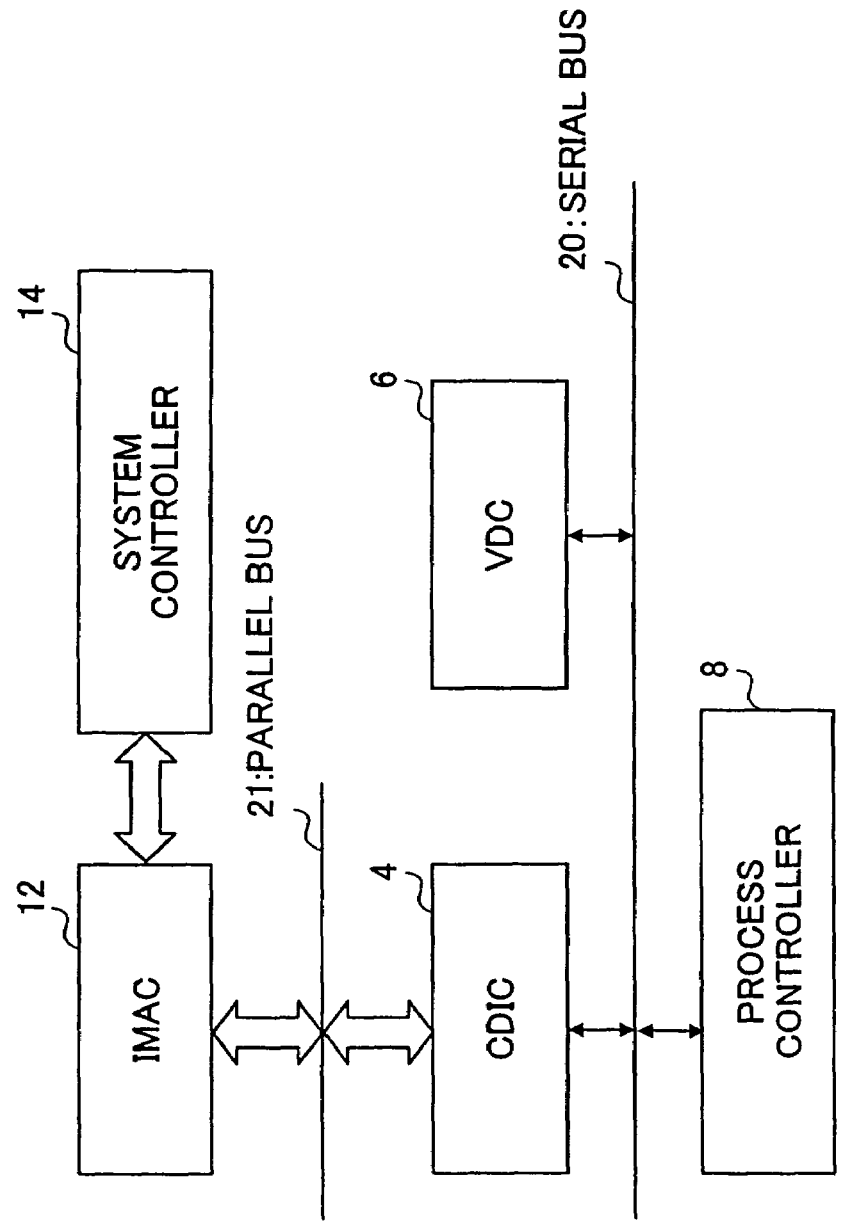
FIG. 10 is an illustration showing a control bus connection of the MFP shown in FIG. 3.
Figure 11A:
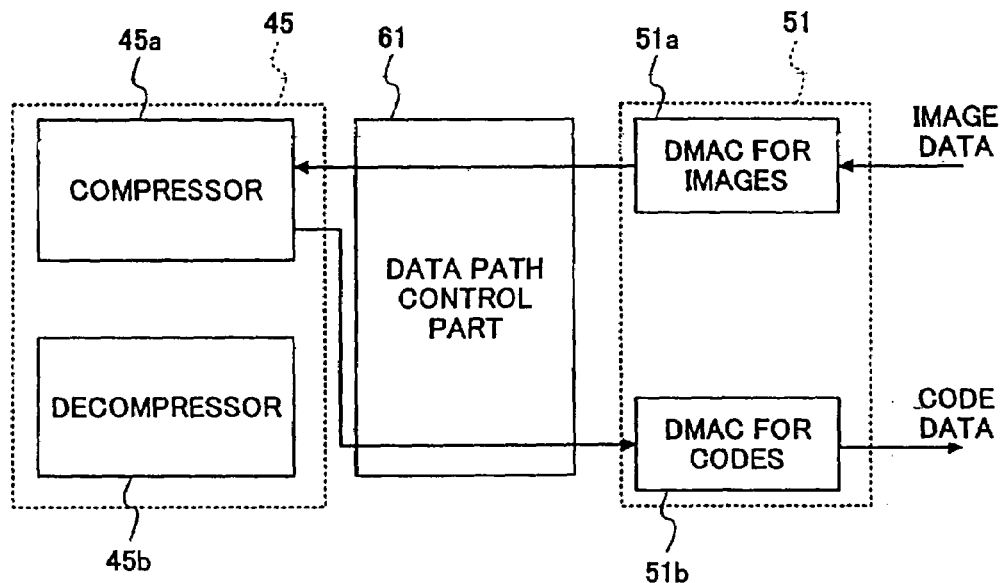
FIG. 11A is an illustration showing a data compressing operation of the IMAC shown in FIG. 4.
Figure 11B:
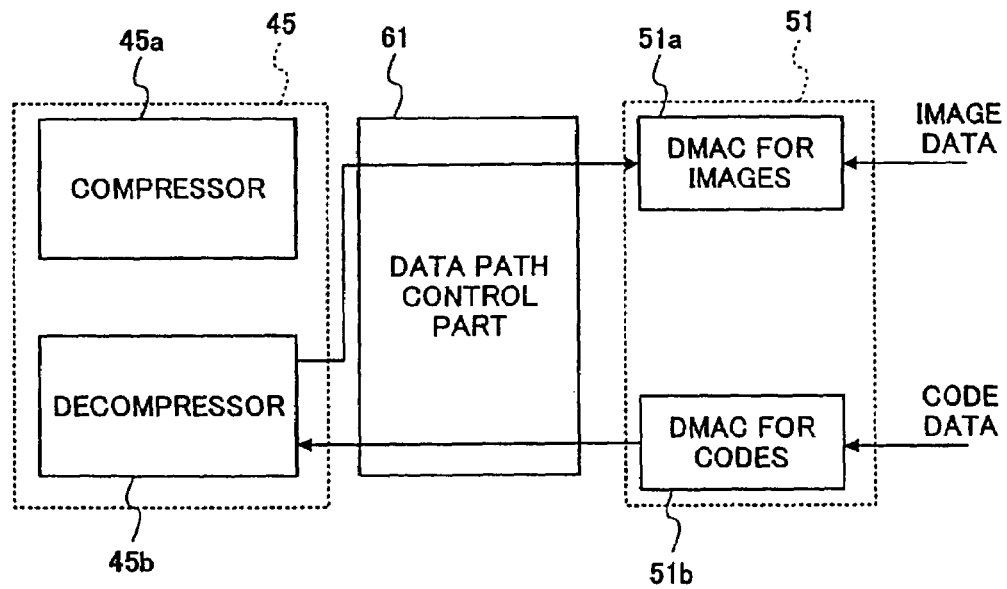
FIG. 11B is an illustration showing a data decompressing operation of the IMAC shown in FIG. 4.

In the printer mode, the MFP 1 supplies the image data for carrying out a print output to the IMAC 12 from the PC 30 connected to the network NW or the general use serial bus 20. After image data is developed on a bit map in the IMAC 12, the image data is transmitted from the IMAC 12 to the VDC 6 via the parallel bus 21. The MFP 1 transmits a control command of the VDC 6 from the system controller 14 to the VDC 6 via the IMAC 12. After the control command is converted into serial data in the VDC 6, the control command is transmitted to the process controller 8 via the serial bus 20. Then, MFP 1 shifts to a write-in control by the process controller 8. The MFP 1 carries out a control based on a route as shown in FIG. 10. That is, the MFP 1 uses a data path of exclusive use without going the data transmission from the CDIC. 4 to the VDC 6 via the parallel bus 21 so s to effectively use the parallel bus 21 and improve the performance of the entire MFP 1. Basically, the performance is improved by the role assignment between the system controller 14 and the process controller 8. By the process controller 8 serving as a coprocessor of the system controller 14, a write-in control and an image-processing control centering on the imaging unit 7 are performed. In performing a data compression/decompression operation, as shown in FIGS. 11A and 11B, the MFP 1 performs a compression/decompression processing using the compression/decompression part 45 of the IMAC 12, the data path control part 61 of the memory control part 44, and the DMAC 51. The compression/decompression part 45 is provided with a compressor 45a and a decompressor 45b, which are used by being switched between compression and decompression. The DMAC 51 is provided with the DMAC 51a for images and the DMAC 51b for codes, which are used by being switched between compression and decompression. That is, the MFP 1 avoids a collision of data on the DMAC 51 by using different channels of the DMAC 51 for the access to MEM 13 based on image data and code data.

When compressing image data (encoding), as shown in FIG. 11A, the MFP 1 takes in the image data from the MEM 13 by DMAC 51a for images through the memory control part 44 and the access control part 41. The MFP 1 compresses the image data by encoding by eliminating the redundant correlation information between pixels by the compressor 45a of the compression/decompression part 45. The MFP 1 transmits the encoded data to the DMAC 51b for codes by the data path control part 61, and stores encoded data in the MEM 13 under the intervention of the memory control part 44 after an access control. When decompressing (decoding) compresses data, as shown in FIG. 11B, the MFP 1 takes in the encoded data from the MEM 13 by the DMAC 51b for codes through the memory control part 44 and the access control part 41. The MFP 1 decompresses the encoded data by encoding by complementing the correlation information between pixels by the decompressor 45b. The MFP 1 transmits the decoded image data to the DMAC 51a for images by the data path control part 61. After an access control, the MFP 1 stores the image data in the MEM 13 under the intervention of the memory control part 44, or transmits the image data to an external bus from the parallel bus control part 48, the network control part 47, or the serial port control part 49 without passing though the DMAC 51a for images. When performing pixel density conversion, the MFP 1 shares the process to the IMAC 12 and the system controller on the MEM 13 that is shared by the whole MFP 1. A smoothing processing depending on a footer engine characteristic is assigned to the VDC 6. For example, when converting into a twice pixel density in each of the main scanning direction and the subscanning direction by a pixel density conversion, the data to be subjected to the pixel density conversion may include read image data, facsimile data and the digital data from the PC 30. In a case of read image data, the MFP 1 performs a dot rearrangement after the density conversion by the IPP 5, which is a programmable operation processor, to the image data maximum-quantized to the number of bits smaller than the number of quantization bits by the SBU 3. In a case of facsimile data or image data from PC 30, the MFP 1 performs a dot rearrangement after performing a density conversion with respect to binary value data.

That is, in the case of the read image data, the MFP 1 quantizes the analog data of an image, which is read by the light-receiving element of the SBU 3, into 8-bit/pixel by the SBU 3, and applies an image processing by the IPP 5. In the MFP 1, although the IPP 5 performs a gradation processing such as an error diffusion processing so as to reconstruct an image according to an area gradation supposing a transfer paper output, a processing algorithm and a setting parameter are carried out programmably, and an operation processing is performed so as to achieve a highest image quality and processing speed. The MFP 1 quantizes the image data into 3-bit/pixel data having a small bit number by the gradation processing of the IPP 5, and transmits the quantized data to the IMAC 12 via the CDIC through the parallel bus 21. In addition, it is assumed that the reading unit 2 is a device of 600 dpi in the main scanning direction and 600 dpi in the subscanning direction, and the imaging unit 7 has a high definition plotter printable by 1200 dpi in the main scanning direction and 1200 dpi in the subscanning direction. The MFP 1 accumulates the image data transmitted to the IMAC 12 in the MEM 13.

Figure 12A:
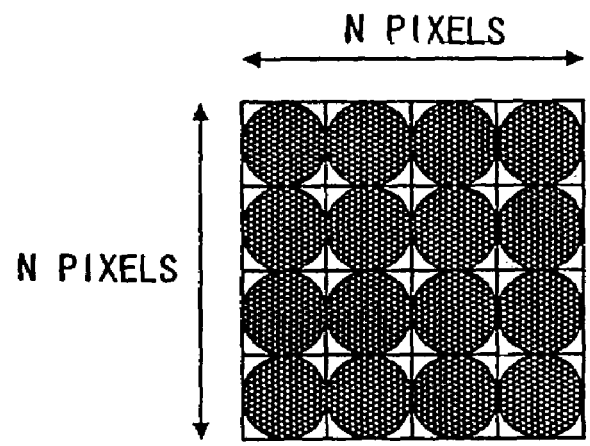
FIGS. 12A, 12B and 12C are is illustrations for explaining a pixel density conversion process applied to read image data by the MFP shown in FIG. 3.
Figure 12B:
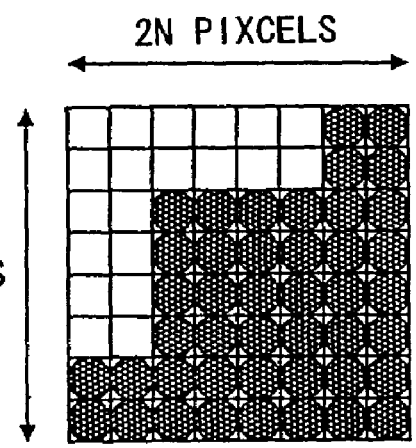
Figure 12C:
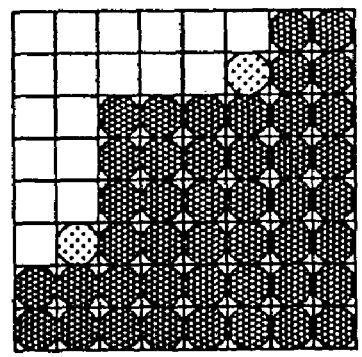

As shown in FIG. 12A, a 600 dpi×600 dpi×3 bits image is accumulated in the MEM 13 managed by the IMAC 12 with respect to a size of an original to be read. It should be noted that FIG. 12A shows data of a size of N pixel×N pixel. The IMAC 12 carries out a bit map conversion so as to convert the bit map into a high definition density of 1200 dpi×1200 dpi×1 bit, as shown in FIG. 12B. That is, in the image data of low resolution, 3 bits of concentration information of each pixel are converted into a pixel density of high resolution. In this case, in response to an increase of the number of pixels, concentration information is deleted and is converted into a binary value image. It should be noted that FIG. 12B shows an example in which an area of an original the same as the bit map of FIG. 12A is converted into high-density data of 2N pixels×2N pixels, although the number of pixels of FIG. 12A is merely increased in both the main scanning direction and the subscanning direction. Moreover, the IMAC 12 performs a smoothing processing on the bit map stored in the MEM 13. FIG. 12C shows an example in which a smoothing processing is applied to a binary value bit map after the density conversion shown in FIG. 12B. In the smoothing processing, the binary value data is again converted into multi-value data so as to reproduce fine pixels.

It should be noted that, in FIG. 12C, thin black dots (circle of hatching) indicate pixels interpolated by a pattern matching processing although consideration is not give to a multi value processing. A corner of the central part, which is angled in FIG. 12B, is subjected to a pattern matching processing so as to carry out a correction processing to form smooth edges.

In addition, when a record engine of the imaging unit 7 is a laser write-in type, a pulse width and a laser power to 1 pixel is changed so as to carry out a multi-value writing in which an interval of 1 pixel is divided. Thereby, the above-mentioned recording, which correctly reproduces the bit map data which has been subjected to the pixel density conversion and the smoothing processing, can be performed. Moreover, in a case in which the imaging unit 7 corresponds to a record engine which injects droplets of ink such as an inkjet printer, a multi-value level can be reproduced by recording an image by controlling an amount of ink.

The MFP 1 performs a density conversion also on facsimile data or binary value data from the PC 30. Since gradation data is not assigned to 1 pixel with respect to the facsimile data or binary value data from the PC 30, dots are rearranged based on arrangement of circumference pixels after carrying out a density conversion. However, practically, there is no problem even if simple expansion is applied in the main scanning direction and the subscanning direction. Since a high-resolution processing with respect to edges is assigned to the smoothing processing, there is no need to perform a pattern matching processing in the IMAC 12, thereby carrying out a high-speed pixel conversion.

That is, supposing FIG. 12A shows a bit map of a binary value image of 600 dpi×600 dpi×1 bit from the PC 30, each pixel in the bit map is simply doubled in both the main scanning direction and the subscanning direction so s to convert into a pixel density of 1200 dpi×1200 dpi×1 bit. With respect to the smoothing processing shown in FIG. 12C, similar to the read image data, the imaging unit 7 commonly processes the image data irrespective of whether the image data is of a copy mode, a facsimile mode or a printer mode. After converting the bit map on the MEM 13 into the output pixel density of the record engine of the imaging unit 7, the bit map data is treated as bit map data independent of the input device.

Figure 13:
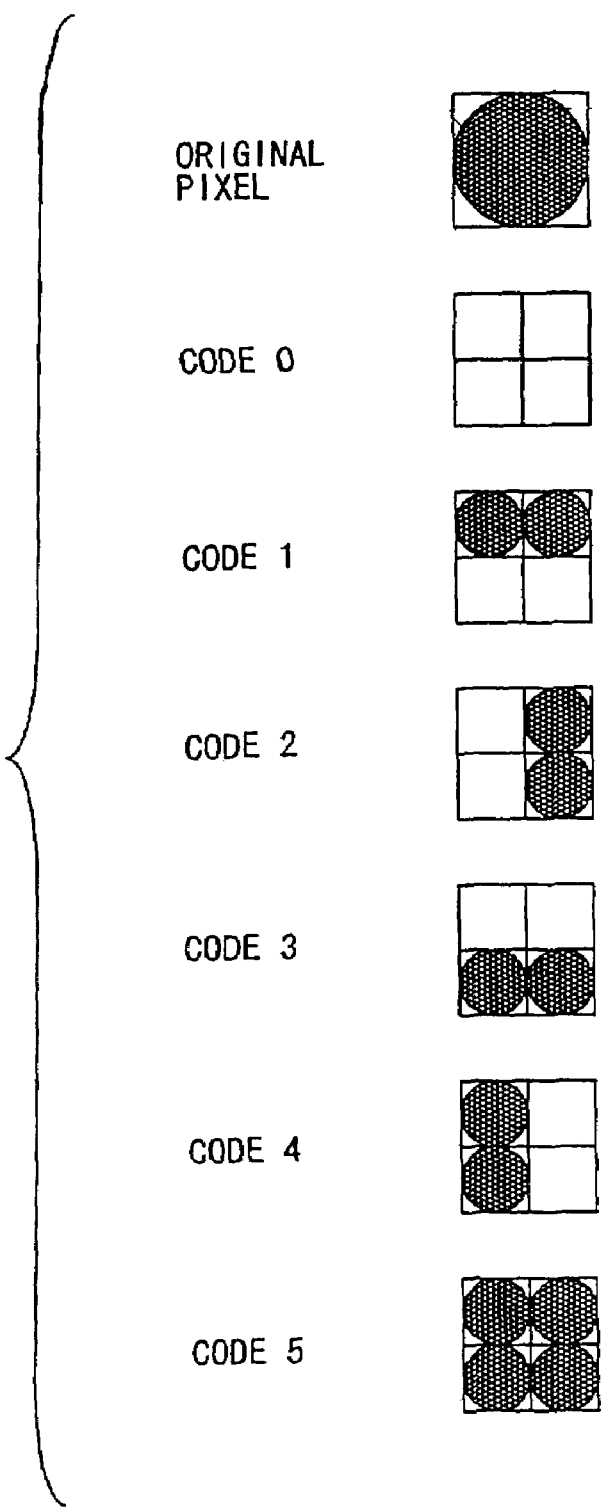
FIG. 13 is an illustration for explaining an example of a code assignment by the MFP shown in FIG. 3.
Figure 14:
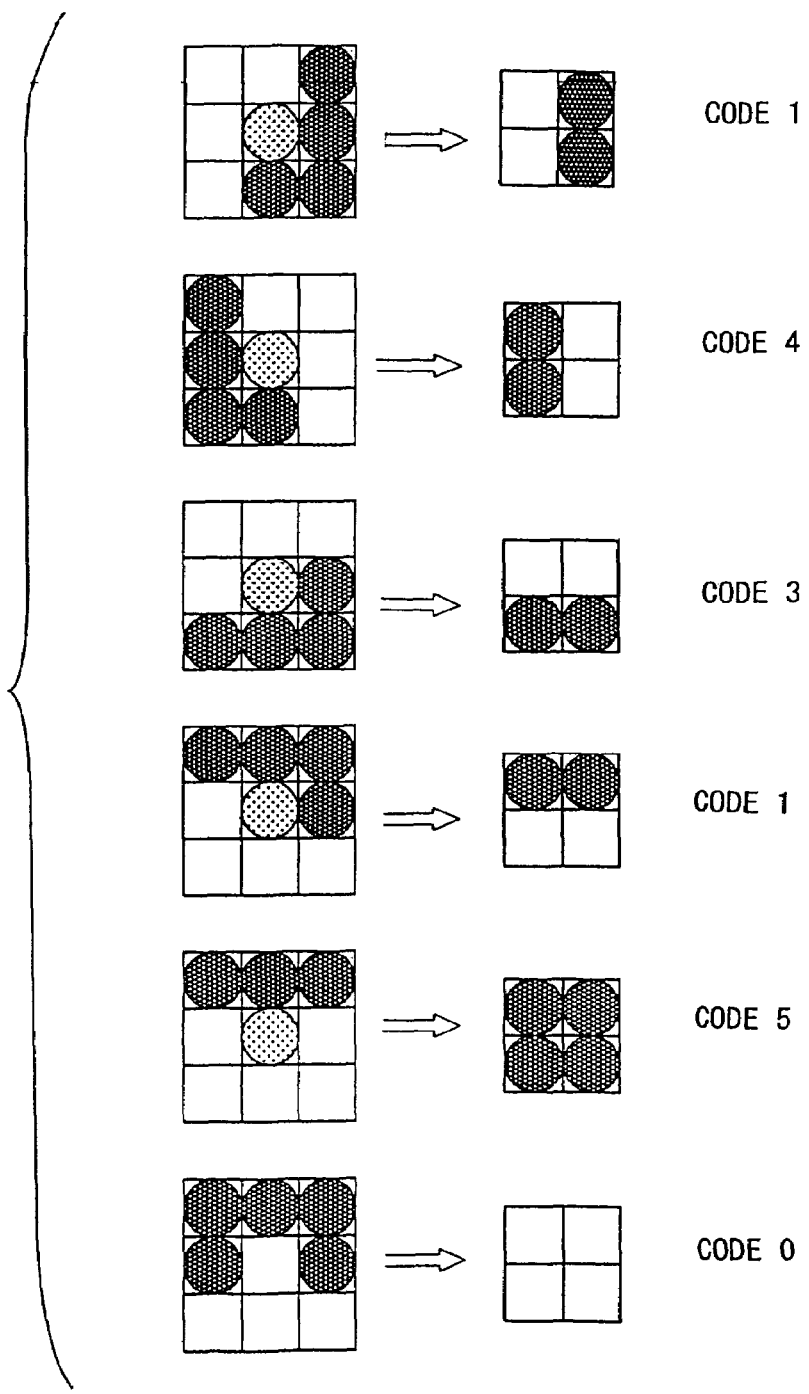
FIG. 14 is an illustration for explaining an example of a code conversion shown in FIG. 13.

Density conversion and code assignment is performed in the dot processing, as shown in FIGS. 13 and 14. In the density conversion, a control of 1 dot corresponding to an isolated pint of which dot reproducibility depends on the record engine of the imaging unit 7 is assigned to the smoothing processing. Moreover, a dot arrangement is performed by the density conversion so that an isolated 1 dot of white or black is not formed.

For example, when rearranging 1 pixel of 600 dpi to 4 pixels of 1200 dpi, the 4 pixels are arranged in a square area so as to form 2×2 pixels in the main scanning direction and the subscanning direction. In this case, there are only six arrangements of the dots which can be taken, that is, all white, all black and an arrangement in which a pair of two dots are formed. Two consecutive pixels in the a diagonal direction shall not be permitted, and a control of 1-dot in each of the main scanning direction, the subscanning direction and the diagonal direction is assigned to the smoothing processing.

A direction of connection of the pixels is beforehand taken into consideration at the time of the density conversion by the IMAC 12 so that the pattern matching by the smoothing processing can be carried out easily at a high speed. That is, in the original pixel of 600 dpi shown in FIG. 13, a code 0 is assigned to all whites, a code 5 is assigned to all blacks, and codes 1 to 4 are assigned to four kinds of arrangement of a pair of two pixels in vertical and horizontal directions. Therefore, the number of generated patterns after the density conversion is six, and all generation patterns can be represented by 3 bits. Change in the amount of data in this pixel density conversion is as follows. Namely, as for the read image data, image data corresponding to the size of a read original is transmitted to the IMAC 12 with a small value (less than 8 bits) from the IPP 5. With respect to the size of the read original, a generated pattern is 600 dpi×600 dpi×3 bit, and the pixel density conversion with respect to the same size of the original becomes ((1200 dpi×1200 dpi)/4)×3 bits. Here, the reason for dividing by "4" is to assign all 4 pixels to a 3-bit code.

If a ratio of the two above-mentioned equations is taken, the ratio of the data transmitted to the VDC 6 from the MEM 13 to the data transmitted to the MEM 13 from the IPP 5 becomes "1" which indicates the same amount of data. As compared to a case where the converted data is transmitted to the VDC 6 as it is, the amount of data is reduced to three quarters, thereby improving transmission efficiency. Therefore, when a small value level from the IPP 5 is greater than 3 bits, the transmission efficiency from the MEM 13 to the VDC 6 is relatively improved. Moreover, although the transmission efficiency to the VDC 6 deteriorates relatively when the small value level is less than 3 bits, the amount of data can be reduced to three quarters than a case in which the converted pixels of 1200 dpi×1200 dpi is transmitted without change.

The above-mentioned example is the case of read image data. In a case of facsimile data or print data from the PC 30, an amount of data of the transmission code after pixel density conversion can be reduced to three quarters than directly transmitting the data, thereby improving the transmission efficiency.

FIG. 14 shows an example of a case in which a pattern matching is carried out in a 3×3 pixel area of 600 dpi×600 dpi. In FIG. 14, a thin-color pixel (pixel indicated by a hatched circle) positioned in the center of 3×3 pixels is an attention pixel. In FIG. 14, the attention pixel is converted into 2×2 pixels of 1200 dpi×1200 dpi. That is, in FIG. 14, when the attention pixel is located on an edge and three pixels exist on the right side, the attention pixel is converted into two pixels which are consecutively arranged in the right part in the vertical direction, and a code 2 is assigned thereto. When the attention pixel is located on an edge and three pixels exist on the left side, the attention pixel is converted into two pixels which are consecutively arranged in the left part in the vertical direction, and a code 4 is assigned thereto. When the attention pixel is located on an edge and three pixels exist on the lower side, the attention pixel is converted into two pixels which are consecutively arranged in the lower part in the horizontal direction, and a code 3 is assigned thereto. When the attention pixel is located on an edge and three pixels exist on the upper side, the attention pixel is converted into two pixels which are consecutively arranged in the upper part in the horizontal direction, and a code 1 is assigned thereto. When the attention pixel is located as a convex pixel in any directions, the attention pixel is converted into all black pixels, and a code 5 is assigned thereto. When the attention pixel is located as a concave pixel in any directions, the attention pixel is converted into all white pixels, and a code 0 is assigned thereto. It should be noted that these patterns are examples and a code is assigned to each of pixel arrangements which can be formed. A pixel density conversion is performed by the system controller 14 with respect to image data in the MEM 13 by referring to corresponding pixels by memory access of the IMAC 12.

Figure 15:
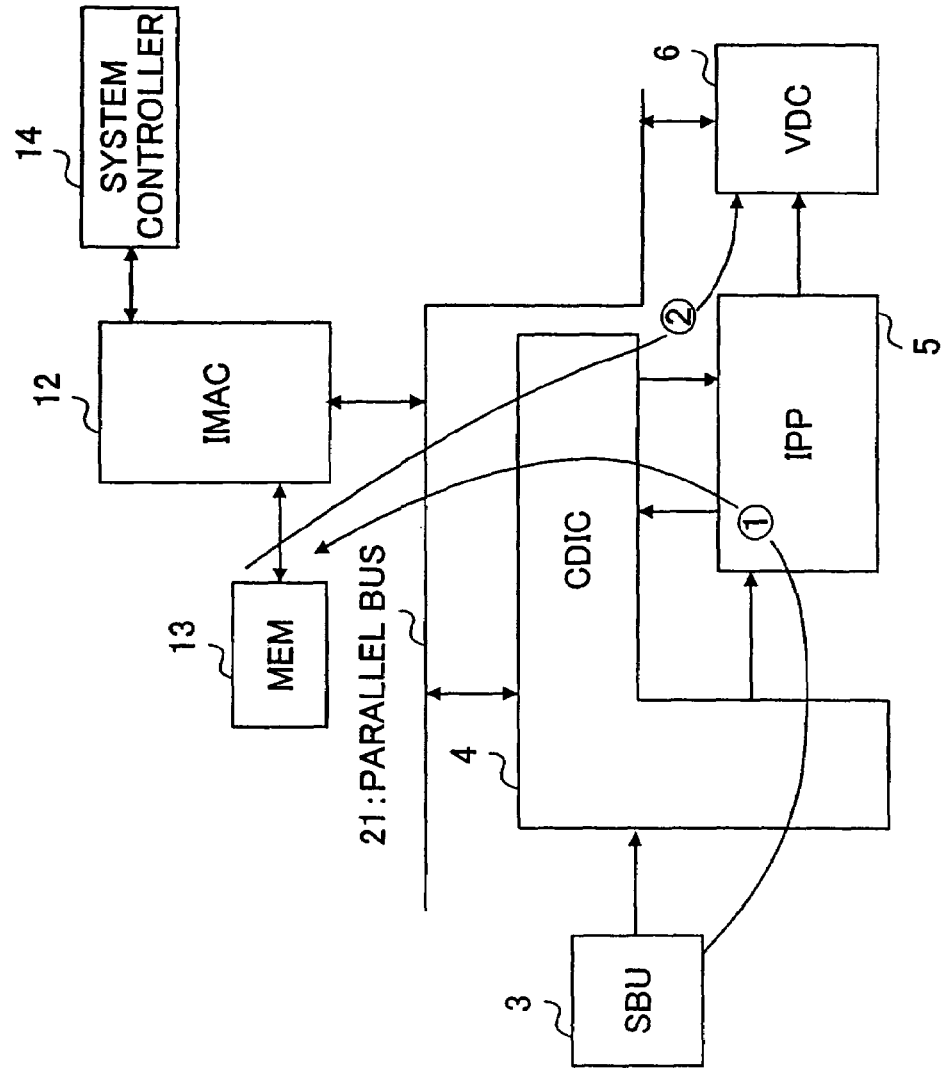
FIG. 15 is a block diagram showing data transmission paths of read image data when a pixel density conversion process is performed by the MFP shown in FIG. 3.
Figure 16:
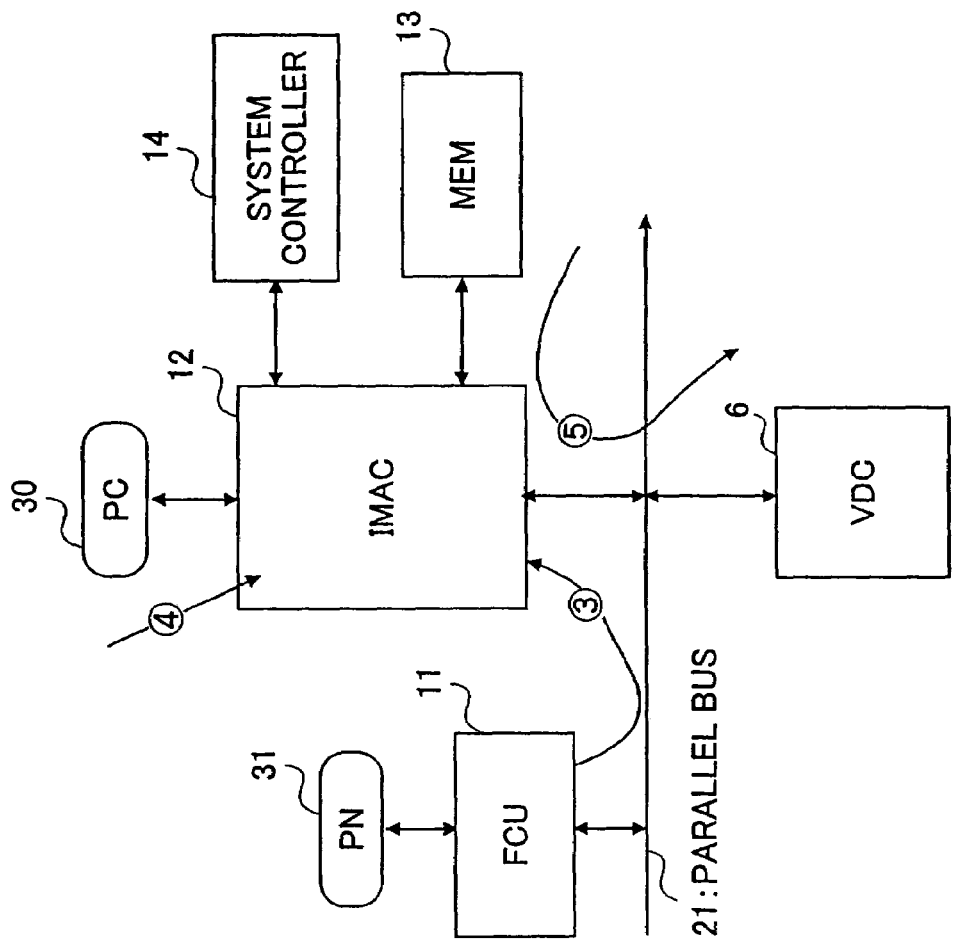
FIG. 16 is a block diagram showing data transmission paths of binary value image data when a pixel density conversion process is performed by the MFP shown in FIG. 3.

In the above-mentioned data processing, data transmission is performed along the path course of data transmission shown in FIGS. 15 and 16. FIG. 15 shows the data transmission path in the case of the pixel density conversion and the edge smoothing processing applied to the read image data, which is an example of 600 dpi read and 1200 dpi write.

In the case of read image data, as indicated by a data transmission path (1) shown in FIG. 15, the read image data of 600 dpi×600 dpi, which is read by the light-receiving element of the SBU 3 and is converted into digital data, is transmitted to the IPP 5. In the IPP 5, the read image data is re-quantized into a small value of 3 bits/pixel. The quantized data is stored in the MEM 13 via the CDIC 4, the parallel bus 21 and the IMAC 12. In the IMAC 12 and the system controller 14, the read image data stored in the MEM 13 is density-converted into a binary value image of 1200 dpi×1200 dpi in the IMAC 12 and the system controller 14, and a code of 3 bits is assigned. The above processing is performed so as to grouping four pixels and assign a code, and the amount of data is reduced rather than directly treating as bit data. As indicated by a data transmission path (2) shown in FIG. 15, the converted data is transmitted from the MEM 13 to the VDC 6 via the IMAC 12, the parallel bus 21 and the CDIC 4. In the above-mentioned data transmission, there is no change in the amount of data on the data transmission course (1), and the transmission efficiency of the parallel bus 21 does not decrease due to a highly densification. Then, as mentioned above, the code data transmitted to the VDC 6 is decoded in the VDC 6. Then, after correcting the image data to a high print quality by applying the edge smoothing, the record output of the image is carried out by the imaging unit 7.

FIG. 16 shows a data transmission path in a case in which binary image data, which is facsimile data or print data from the PC 30, is subjected to a density conversion. In the case of binary value image data, as indicated by a data transmission path (3) shown in FIG. 16, the facsimile received binary value image data is developed on the MEM 13 via the IMAC 12. On the other hand, the print data from PC 30 is developed on the MEM 13 via the IMAC 12, as indicated by a data transmission path (4) shown in FIG. 16. The binary value bit map data developed on the MEM 13 via the data transmission path (3) or (4) is density-converted into 1200 dpi×1200 dpi which is the resolution of the record engine of the imaging unit 7. In this case, the image data is converted into code data corresponding to two consecutive pixels which does not generate an isolated single dot of white or black so as to reduce the amount of data transmitted to the parallel bus 21. The bit map data is transmitted from the MEM 13 to the VDC 6 through the parallel bus 21, as indicated by a data transmission path (5) shown in FIG. 14. The VDC 6 decodes the transmitted code data, and performs an edge smoothing processing on the binary value bit map image so as to carry out a record output by the imaging unit 7.

Thus, MFP 1 according to the present embodiment temporarily stores in the MEM 13 the digital image signal, which is generated by converting read image data of an original into digital data, or the digital image signal which is generated digitally. The, the image signal stored in the MEM 13 is processed to generate an output image signal, which can be record output by a write-in control of the imaging unit 7. At this time, an access of the digital image signal to the MEM 13 is totally managed. Moreover, when a pixel density conversion is performed to increase a pixel density of the digital image signal stored in the MEM 13, the amount of transmission data is reduced.

Therefore, the central-controlled MEM 13 is shared by a plurality of functions, which results in an effective use of the MEM 13. Moreover, the density conversion can be carried out so that the converted data matches the pixel density. Moreover, resources can be used effectively by an inexpensive and small MFP 1, and a high-definition image can be generated.

Moreover, the MFP 1 according to the present embodiment stores image data in the MEM 13 after applying an arbitrary process to the digital image signal, which is read from an original and digitally converted, by the IPP 5 which is a programmable operation processor so as to change the read image data to the number of quantization steps less than the number of read quantization when reading Therefore, an image quality can be improved by applying an arbitrary process to the read image data, and also the data transmission efficiency to the MEM 13 can be improved.

Furthermore, when the MFP 1 according to the present embodiment converts a low-density single dot into a plurality of high-density pixels, the MFP 1 arranges the converted high-density pixels in a square area while preventing generation of an isolate black or white pixel. Therefore, the number of pixels in the main scanning direction and the subscanning direction can be increased simultaneously, and a high pixel density conversion of high conversion efficiency can be achieved.

Moreover, the MFP 1 according to the present embodiment separates mutually pixel density conversion processing, which converts a pixel density of a digital image signal, and the edge smoothing processing, which smoothes an edge of black pixels and white pixels, and performs the pixel density conversion processing on the MEM 13, and performs the edge smoothing processing by a write-in control of the imaging unit 7. Therefore, the smoothing processing and pixel density conversion depending on the characteristic of the imaging unit 7 can be carried out independently, and processing time for the pixel density conversion can be shortened. Thereby, a higher definition image can be promptly generated.

Furthermore, the MFP 1 according to the present embodiment transmits image data in the state code data from the MEM 13 to the imaging unit 7 and reverse-converts the image data into pixel data in the imaging unit 7, and, thereafter, the pixel data is record output by performing a write-in control. Therefore, the data transmission from the MEM 13 to the imaging unit 7 can be more efficiently performed in a short time.

Moreover, a data bus can be effectively used so as to achieve more efficient process at a higher speed. Moreover, the MFP 1 according to the present embodiment transmits the code data, which is to be transmitted from the MEM 13 to the imaging unit 7, by reading from the MEM 13 in synchronization with a signal indicating a writing line of the code data concerned. Therefore, since data can be transmitted according to a request of the imaging unit 7 only when required, a bus occupancy time can be shortened and the whole use efficiency and whole bus use efficiency of the MEM 13 can be improved.

Furthermore, programs of the above-mentioned image-processing method is recordable on a recording medium such as a CD-ROM. The program of the image-processing method may be read from a recording medium by a computer connected to the serial bus 20 shown in FIG. 3. Thus, the central-managed MEM 13 is shared by a plurality of functions so as to effectively use the MEM 13, and the MFP 1 can be constructed to perform a density conversion so as to match a pixel density.

Second Embodiment

Figure 17:
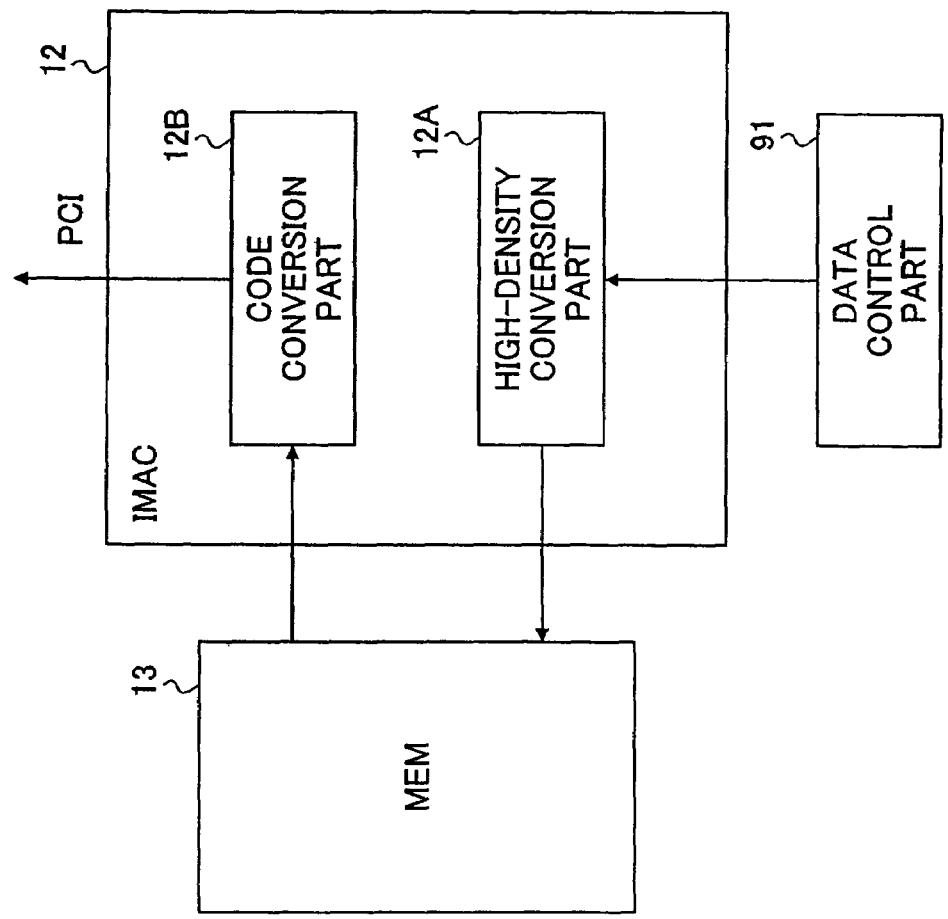
FIG. 17 is a block diagram of a frame memory and a memory access control part (IMAC) in an image processing apparatus according to a second embodiment of the present invention.

A description will now be given, with reference to FIGS. 17 through 22, of an image-processing apparatus and method according to a second embodiment of the present invention. The image-processing apparatus according to the present embodiment has the same whole composition as the image-processing apparatus according to the first embodiment, and a description thereof will be omitted. FIG. 17 is a block diagram showing an outline composition of a frame memory and an image memory access control part (IMAC) according to the present embodiment. In FIG. 17, data output from a data control part 91 of the CDIC 4 is supplied to the IMAC 12, which is a memory controller, via the parallel bus 21 such as a PCI bus. The IMAC 12 is provided with a high-density conversion part 12a and a code conversion part 82. The high-density conversion part 12a converts imaged data of M dpi/N values sent from the data control part 91 into image data of a still higher-density of m dpi/n values (M<m, N>n). The code conversion part 82 performs a code conversion process of data from the MEM 13.

A description will be given, as an example of a pixel density conversion according to the present embodiment, of a case where a density conversion of the data of 600 dpi/5 values into data of 1200 dpi/2 values is performed.

The binary value data after density conversion is stored in the MEM 13, which consists of a frame memory. When the image data stored in the MEM 13 is read and transmitted through the PCI bus again, a transmission efficiency is raised by encoding image data so as to reduce the amount of data.

Figure 18:
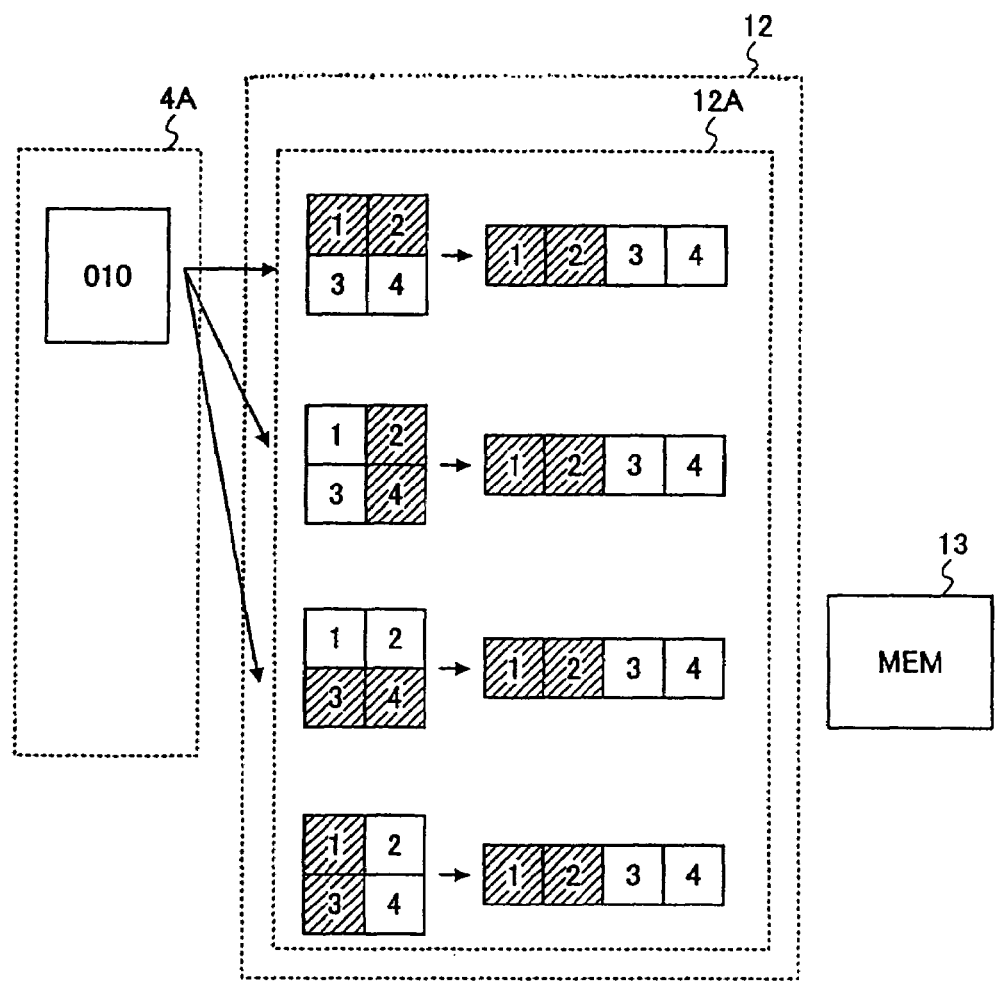
FIG. 18 is an illustration for explaining an operation of a high-density conversion part of the IMAC shown in FIG. 17.

FIG. 18 is an illustration showing a processing operation of a high-density conversion part 12A in the IMAC 12. In FIG. 18, since the data is equivalent to a half dot when the data transmitted from a data control part 4A is 2 of 5-value data, four patterns (3a-3d) can be taken as a pattern. However, since a dot position control is not performed here, the data is converted into 4-bit data as it is, and is stored in the MEM 13.

Figure 19:
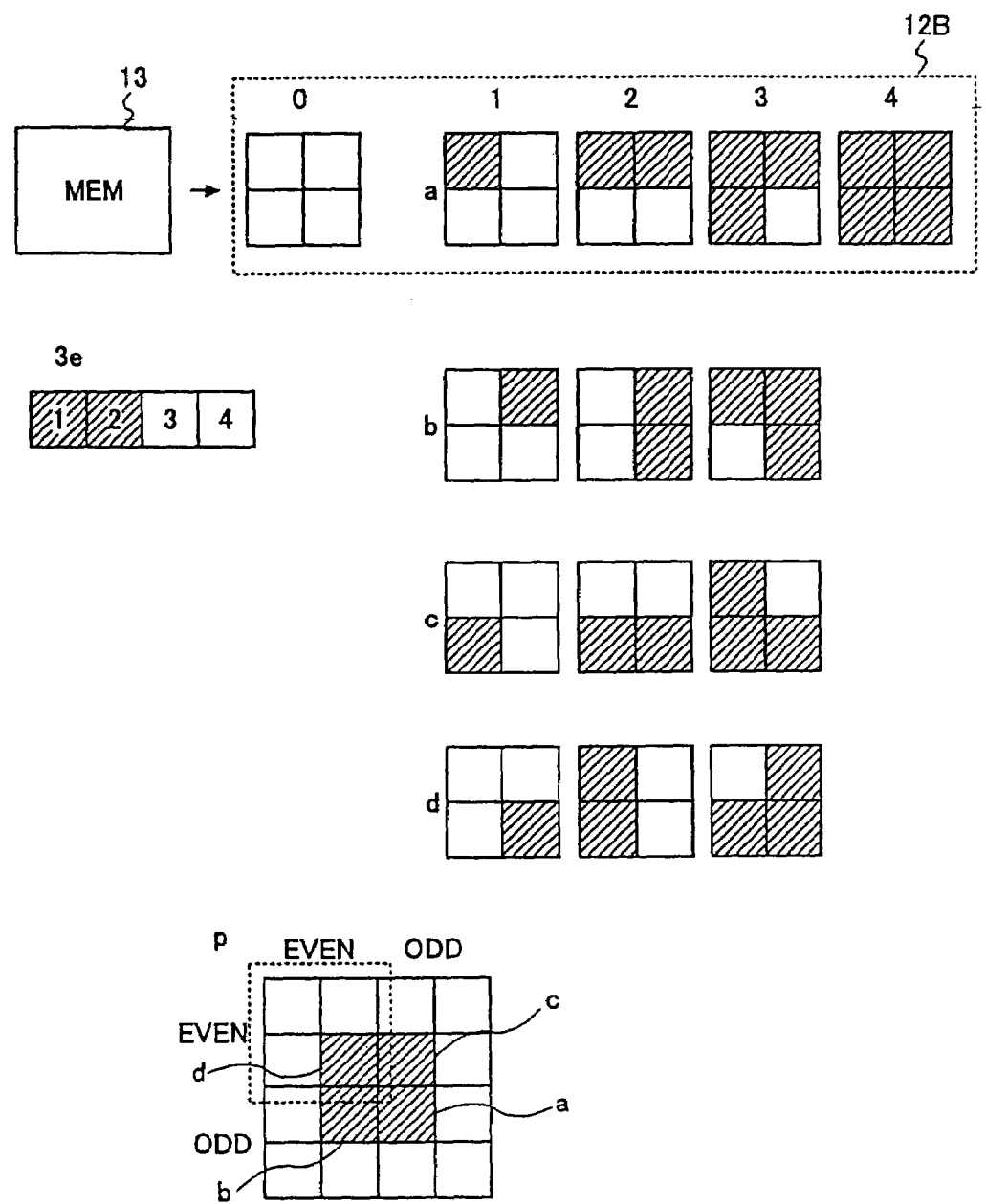
FIG. 19 is an illustration of an example of an operation performed by a code conversion part of the IMAC shown in FIG. 17.

FIG. 19 is an illustration showing a processing operation of a code conversion part 12B in the IMAC 12. In FIG. 19, considering the arrangement of the data stored in the MEM 13, there are patterns a-d in accordance with each size. However, there is a regularity in the dot position control, and when a pixel is enlarged by a dot concentration method so as to strike the dot stably, there is considered a pattern indicated by 401. In this example of the regularity, P corresponds to a single pixel of 600 dpi, and it is represented to enlarge the pixels from positions of d, c, a and b, in that order, when the pixel of 600 dpi is divided into four pixels of 1200 dpi and strike each dot at a quarter power. That is, since the position from which a strike a pixel is started is decided by the position of the input image data, the code, which the IMAC 12 supplies, is merely related with the size of data. Therefore, what is necessary is to encode only five patterns (3 bits) of a instead of 14 patterns (4 bits) including the original patterns of a, b, c and d. Thus, the amount of data, which is transmitted through the bus, decreases, and its transmission efficiency improves.

FIG. 20 is an illustration showing another processing operation of the code conversion part in the IMAC 12. As indicated by 501, this example is a case where a strike of dot is started at the same position in every position, which is an advantageous dot formation method to express a high resolution for a thin line or the like. Also in this case, in order to perform a code conversion by a code conversion part 12B, only five code patterns (3 bits) are required. Furthermore, there is no need to decide a position from which a dot strike is started according to the image data position.

Figure 21:
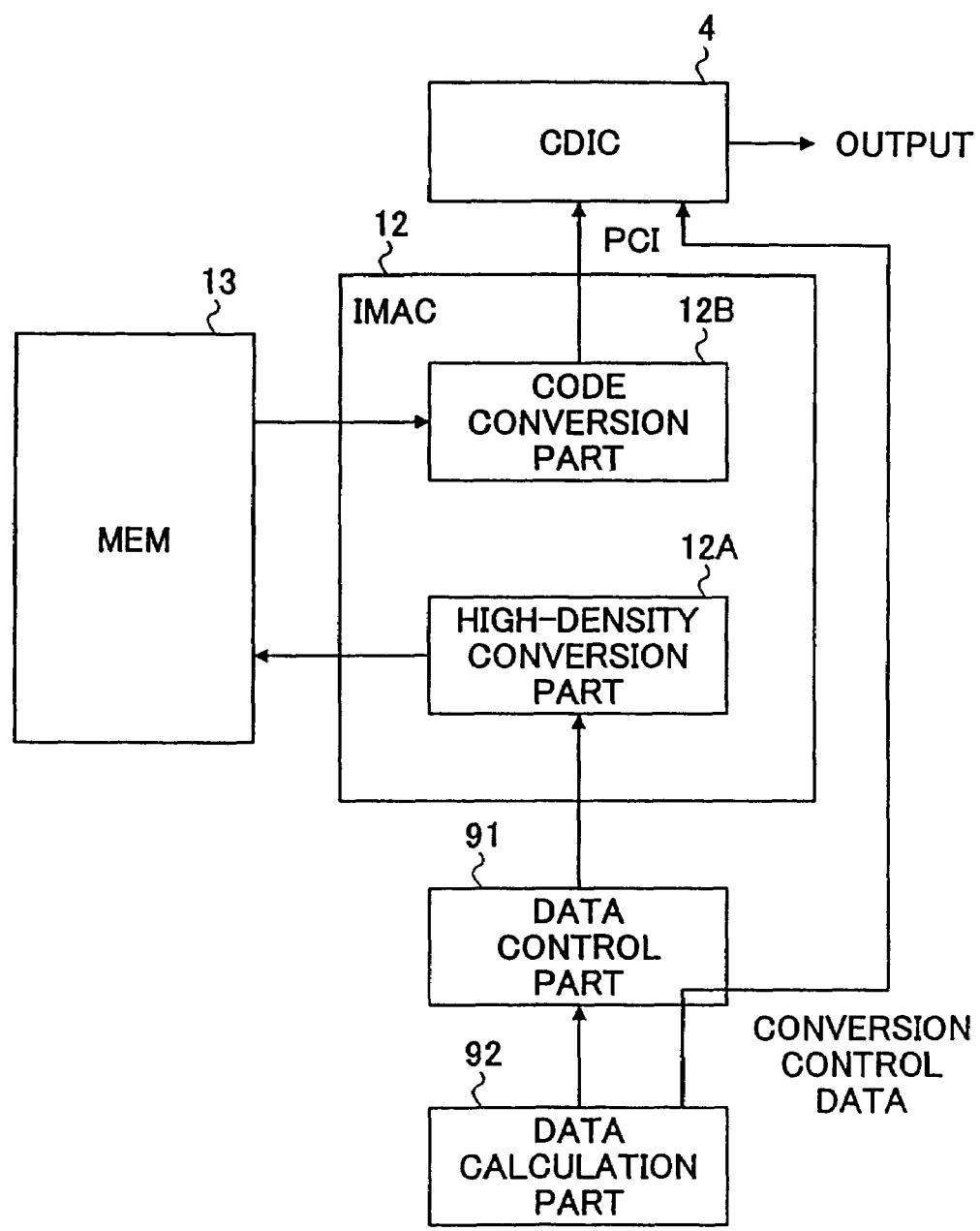
FIG. 21 is a block diagram of the IMAC and other peripheral parts configured to perform an operation to change pixel positions.

FIG. 21 is a block diagram showing an example of a composition in the case of changing pixel arrangement according to an image data position. In FIG. 21, the data operation part 92 and CDIC 4 are added in addition to the composition shown in FIG. 17. The code data reduced most efficiently is transmitted to the CDIC 4 through the PCI bus (parallel bus 21). The code is developed to data by deciding whether to change the pixel arrangement for each position according to information (for example, 1-bit information indicating whether it is an edge or non-edge) separately sent from the IPP 5.

Figure 22:
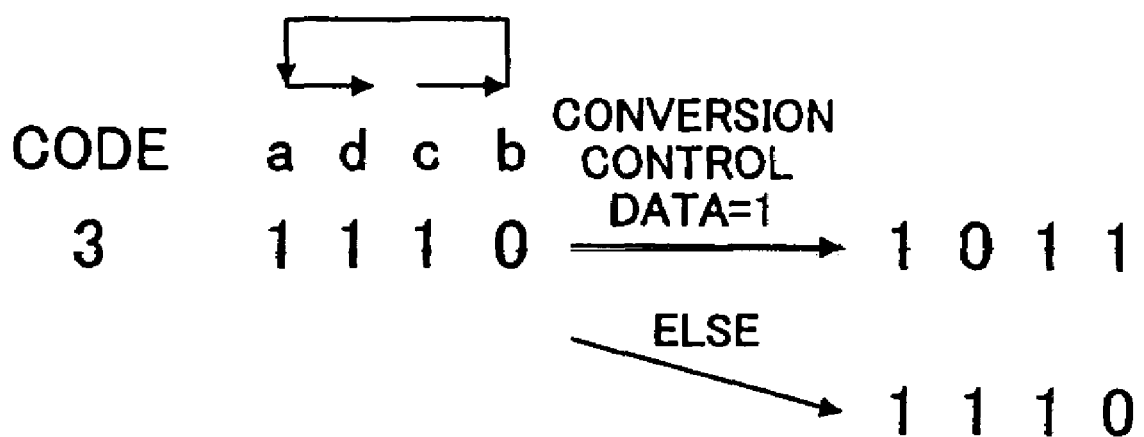
FIG. 22 is an illustration showing an example of data development.

FIG. 22 is an illustration showing an example of the development of data encoded as mentioned above. As shown in FIG. 22, although "1110" is obtained if the code is 3 and is developed as it is, a position is shifted so as to obtain "1011" only when a conversion control is performed. In FIG. 22, when the pixel is arranged by the pattern of c, "1011" is obtained by starting a reading operation of 4-bit "1110" data from the position of c.

It should be noted that process programs for performing the above-mentioned process may be stored in a recording medium such as a CD-ROM, which is readable by a computer connected via the serial bus 20 as shown in FIG. 3. Moreover, the process programs may be stored in the ROM 10.

The present invention is not limited to the specifically disclosed embodiments, and variations and modifications may be made without departing from the scope of the present invention.

The present application is based on Japanese priority applications No. 2000-29863 filed on Sep. 29, 2000, No. 2000-294698 filed on Sep. 27, 2000 and No. 2001-266382 file on Sep. 3, 2001, the entire contents of which are hereby incorporated by reference.

What is claimed is:

1. An image-processing apparatus comprising:
a memory storing a digital image signal;
an image processing part converting the digital image signal stored in said memory into an output image signal so that a pixel density of the output image signal is higher than a pixel density of the digital image signal read from said memory; and
a programmable operation processor processing the digital image signal so as to reduce a number of quantization steps of the digital image signal and store the digital image signal having a reduced number of quantization steps in said memory.

2. An image-processing apparatus comprising:
a memory storing a digital image signal;
an image processing part converting the digital image signal stored in said memory into an output image signal so that a pixel density of the output image signal is higher than a pixel density of the digital image signal read from said memory; and
a memory access control part that arranges pixels of the output image signal in a square area while preventing generation of an isolated single pixel of black or white when converting the digital image data into the output image data.

3. An image-processing apparatus comprising:
a memory storing a digital image signal;
an image processing part converting the digital image signal stored in said memory into an output image signal so that a pixel density of the output image signal is higher than a pixel density of the digital image signal read from said memory;
a memory access control part that includes a pixel density conversion part converting the digital image signal by using said memory; and
said image processing part includes an edge smoothing part smoothing an edge of black pixels and white pixels, wherein said edge smoothing part is controlled, separately from said pixel density conversion part, by a write-in control performed by an imaging unit outputting a visible image based on the output image signal.

4. An image-processing apparatus comprising:
a memory storing a digital image signal; and
an image processing part converting the digital image signal stored in said memory into an output image signal so that pixel densities of the output image signal in a main scanning direction and a subscanning direction are higher than pixel densities of the digital image signal in the main scanning direction and the subscanning direction read from said memory,
wherein;
the output image signal is transmitted from said memory to an imaging unit in a form of code data; and
said imaging unit converts the code data into pixel data so as to perform an image output under a write write-in control of said imaging unit.

5. The image-processing unit as claimed in claim 4, wherein translation of the code data from said memory to said imaging unit is performed in synchronization with a signal indicating a write-in line of the code data.

6. An image-processing method comprising the steps of:
storing a digital image signal in a memory;

reading the digital image signal from said memory;

converting the read image data into an output image data having pixel densities in a main scanning direction and a subscanning direction higher than pixel densities of the read image data in the main scanning direction and the subscanning direction; and outputting the output image data to an imaging unit forming a visible image based on the output image data, wherein a number of quantization steps of the digital image signal is reduced.

7. A program, stored in a computer-usable medium, for causing an image-processing apparatus to perform an image-processing method, the image-processing method comprising:

storing a digital image signal in a memory;

reading the digital image signal from said memory;

converting the read image data into an output image data having pixel densities in a main scanning direction and a subscanning direction higher than pixel densities of the read image data in the main scanning direction and the subscanning direction; and outputting the output image data to an imaging unit forming a visible image based on the output image data, wherein a number of quantization steps of the digital image signal is reduced.

8. A processor readable medium storing a program for causing an image-processing apparatus to perform an image-processing method, the image-processing method comprising:

storing a digital image signal in a memory;

reading the digital image signal from said memory;

converting the read image data into an output image data having pixel densities in a main scanning direction and a subscanning direction higher than pixel densities of the read image data in the main scanning direction and the subscanning direction; and outputting the output image data to an imaging unit forming a visible image based on the output image data, wherein a number of quantization steps of the digital image signal is reduced.

* * * * *